United States Patent
Swier et al.

(10) Patent No.: US 11,702,512 B2
(45) Date of Patent: Jul. 18, 2023

(54) POLYSILOXANE RESIN-POLYOLEFIN COPOLYMER AND METHODS FOR THE PREPARATION AND USE THEREOF

(71) Applicant: Dow Silicones Corporation, Midland, MI (US)

(72) Inventors: Steven Swier, Midland, MI (US); John Horstman, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 367 days.

(21) Appl. No.: 17/055,144

(22) PCT Filed: Apr. 8, 2019

(86) PCT No.: PCT/US2019/026233
§ 371 (c)(1),
(2) Date: Nov. 13, 2020

(87) PCT Pub. No.: WO2020/018159
PCT Pub. Date: Jan. 23, 2020

(65) Prior Publication Data
US 2021/0230372 A1    Jul. 29, 2021

Related U.S. Application Data

(60) Provisional application No. 62/699,192, filed on Jul. 17, 2018.

(51) Int. Cl.
| C08G 77/442 | (2006.01) |
| B01J 31/14 | (2006.01) |
| C08F 110/02 | (2006.01) |
| C08G 77/04 | (2006.01) |
| C08G 77/08 | (2006.01) |
| C08G 77/20 | (2006.01) |
| C08L 23/26 | (2006.01) |

(52) U.S. Cl.
CPC .......... C08G 77/442 (2013.01); B01J 31/146 (2013.01); C08F 110/02 (2013.01); C08G 77/045 (2013.01); C08G 77/08 (2013.01); C08G 77/20 (2013.01); C08L 23/26 (2013.01); B01J 2531/30 (2013.01); C08F 2810/40 (2013.01)

(58) Field of Classification Search
CPC ......... C08L 23/26; C08G 77/12; C08G 77/18; C08G 77/442; C08F 210/02
See application file for complete search history.

(56) References Cited

U.S. PATENT DOCUMENTS

| | | | |
|---|---|---|---|
| 2,676,182 A | 4/1954 | Herbert et al. |
| 3,159,601 A | 12/1964 | Ashby |
| 3,175,993 A | 3/1965 | Weyenberg et al. |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,660,443 A | 5/1972 | Boissieras et al. |
| 3,663,649 A | 5/1972 | Wheeler, Jr. |
| 3,691,257 A | 9/1972 | Kendrick et al. |
| 3,814,730 A | 6/1974 | Karstedt |
| 3,989,668 A | 11/1976 | Lee et al. |
| 4,370,358 A | 1/1983 | Hayes et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,707,531 A | 11/1987 | Shirahata |
| 4,766,176 A | 8/1988 | Lee et al. |
| 4,774,310 A | 9/1988 | Butler |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,310,843 A | 5/1994 | Morita |
| 5,744,541 A | 4/1998 | Sawaguchi et al. |
| 5,854,356 A | 12/1998 | Schwindeman et al. |
| 5,910,547 A | 6/1999 | Schwindeman et al. |
| 6,084,030 A | 7/2000 | Janssen et al. |
| 6,127,502 A | 10/2000 | Krahnke et al. |
| 6,175,031 B1 | 1/2001 | Tachikawa |
| 6,235,832 B1 | 5/2001 | Deng et al. |
| 6,265,518 B1 | 7/2001 | Krahnke et al. |
| 6,624,254 B1 | 9/2003 | Arriola et al. |
| 6,753,438 B2 | 6/2004 | Taylor et al. |
| 7,064,173 B2 | 6/2006 | Rubinsztajn et al. |

(Continued)

FOREIGN PATENT DOCUMENTS

| EP | 0347895 | 12/1989 |
| EP | 1907495 | 4/2008 |

(Continued)

OTHER PUBLICATIONS

Ayandele, et al.; Polyhedral Oligomeric Silsesquioxane (POSS)-Containing Polymer Nanocomposites; Nanomaterials 2012; 2: 445.
Bulsari et al., Hydrosilylation of impact polypropylene co-polymer in a twin-screw extruder. Journal of Elastomers & Plastics vol. 40 Issue 4 pp. 365-380, 2008.
Ciolino, A. E., et al. (2004). "Synthesis of polybutadiene-graft-poly(dimethylsiloxane) and polyethylene-graft-poly (dimethylsiloxane) copolymers with hydrosilylation reactions." Journal of Polymer Science Part A: Polymer Chemistry 42(12): 2920-2930.
"Graiver., ""Graft and block copolymers with polysiloxane and vinyl polymersegments."" Silicon Chemistry. 2002, p. 107-120, vol. 1, No. 2. Norwell, Maine."
Inoue, et al. Reactions of Organozinc Coordination Compounds. Journal of Organometallic Chemistry, p. 11-16.

(Continued)

*Primary Examiner* — Kuo Liang Peng
(74) *Attorney, Agent, or Firm* — Catherine U. Brown

(57) ABSTRACT

A polysiloxane resin-polyolefin copolymer may be prepared using either a hydrosilylation catalyst or a Lewis Acid catalyst. The copolymer may have polyorganosilicate or silsesquioxane resin blocks. The copolymer may have polyethylene or poly(ethylene/octene) blocks.

21 Claims, 1 Drawing Sheet

(56) References Cited

U.S. PATENT DOCUMENTS

| | | | |
|---|---|---|---|
| 7,087,686 B2 | 8/2006 | Britovsek et al. |
| 7,148,370 B1 | 12/2006 | Britovsek et al. |
| 7,355,089 B2 | 4/2008 | Chang et al. |
| 7,858,706 B2 | 12/2010 | Arriola et al. |
| 8,017,693 B2 | 9/2011 | Makio et al. |
| 8,053,529 B2 | 11/2011 | Carnahan et al. |
| 8,058,373 B2 | 11/2011 | Stevens et al. |
| 8,088,869 B2 | 1/2012 | Joseph et al. |
| 8,426,519 B2 | 4/2013 | Cogen et al. |
| 8,476,375 B2 | 7/2013 | Backer et al. |
| 8,501,885 B2 | 8/2013 | Arriola |
| 8,501,894 B2 | 8/2013 | Crowther et al. |
| 8,569,417 B2 | 10/2013 | Backer et al. |
| 8,580,073 B2 | 11/2013 | Behl |
| 8,785,554 B2 | 7/2014 | Li Pi Shan et al. |
| 8,835,548 B2 | 9/2014 | Esseghir et al. |
| 8,859,709 B2 | 10/2014 | Katsoulis et al. |
| 9,181,379 B2 | 11/2015 | Backer et al. |
| 9,237,865 B2 | 1/2016 | Wang et al. |
| 9,273,163 B2 | 3/2016 | Crowther et al. |
| 9,387,625 B2 | 7/2016 | Esseghir et al. |
| 9,388,265 B2 | 7/2016 | Burns et al. |
| 9,441,079 B2 | 9/2016 | Yang |
| 9,493,615 B2 | 11/2016 | Backer et al. |
| 9,862,867 B2 | 1/2018 | Gordon et al. |
| 10,453,586 B2 | 10/2019 | Yu et al. |
| 2006/0155090 A1 | 7/2006 | Ferenz |
| 2006/0199930 A1 | 9/2006 | Li Pi Shan et al. |
| 2007/0167578 A1 | 7/2007 | Arriola et al. |
| 2008/0311812 A1 | 12/2008 | Arriola et al. |
| 2009/0042043 A1 | 2/2009 | Joseph et al. |
| 2009/0156776 A1 | 6/2009 | Julian |
| 2010/0181092 A1 | 7/2010 | Cree et al. |
| 2010/0029705 A1 | 8/2010 | Lin et al. |
| 2011/0172367 A1 | 7/2011 | Backer et al. |
| 2012/0178867 A1 | 7/2012 | Esseghir et al. |
| 2012/0283388 A1 | 11/2012 | Backer et al. |
| 2014/0161858 A1 | 6/2014 | Mays et al. |
| 2015/0028518 A1* | 1/2015 | Esseghir ............... C08L 23/04 264/241 |
| 2015/0376482 A1 | 12/2015 | Bekemeier et al. |
| 2016/0200909 A1 | 7/2016 | Chang et al. |
| 2016/0376482 A1 | 12/2016 | Morgeneyer et al. |
| 2017/0133121 A1 | 5/2017 | Yu et al. |
| 2020/0157286 A1 | 5/2020 | Swier et al. |

FOREIGN PATENT DOCUMENTS

| | | |
|---|---|---|
| JP | 03015444 | 3/2000 |
| JP | 2020573215 | 11/2021 |
| WO | 9747665 | 12/1997 |
| WO | 9833842 | 8/1998 |
| WO | 20020081551 | 10/2002 |
| WO | 2003093349 | 11/2003 |
| WO | 2003093369 | 11/2003 |
| WO | 2005090426 | 9/2005 |
| WO | 2005090427 | 9/2005 |
| WO | 20070008765 | 1/2007 |
| WO | 2007035485 | 3/2007 |
| WO | 2009012215 | 1/2009 |
| WO | 20110032172 | 3/2011 |
| WO | 20110073047 | 7/2011 |
| WO | 2012103080 | 8/2012 |
| WO | 2014105411 | 7/2014 |
| WO | 2015000851 | 1/2015 |
| WO | 2015017068 | 2/2015 |
| WO | 2015196459 | 12/2015 |
| WO | 2017091720 | 6/2017 |
| WO | 2017173080 | 10/2017 |
| WO | 2019182718 | 9/2019 |
| WO | 2019182719 | 9/2019 |
| WO | 2019182720 | 9/2019 |
| WO | 2019182721 | 9/2019 |
| WO | 2019182983 | 9/2019 |
| WO | 2019182986 | 9/2019 |
| WO | 2019182988 | 9/2019 |
| WO | 2019182992 | 9/2019 |
| WO | 2019182993 | 9/2019 |

OTHER PUBLICATIONS

Long et al. Surface characteristics of hydro silylated polypropylene. Journal of Applied Polymer Science. vol. 88, Issue 14, pp. 3117-3131 2003.

Louis., "Karstedt Catalyst-Catalyzed stepgrowthh co-polyaddition of 1, 9-decadiene and 1,1, 3, 3,-tetramethyldisiloxane." Journal of Organometallic Chemistry. 2006, p. 2031-2036, vol. 691, No. 9. Elsevier, Amsterdam.

Malz, H. et al., Hydrosilylation of terminal Double Bonds. Polymer Engineering and Science, Dec. 1998, vol. 38, No. 12 p. 1976-1984.

"Niemczyk., ""Study of thermal properties of polyethylene and polypropylenenanocomposites with long alkyl chain-substituted POSS fillers."" J Them Anal Calorim 2016, p. 1287-1299".

Rubinsztajn, et al., Macromolecules 2005, 38:1061. "A New polycondensation process for the preparation of polysiloxane copolymers".

Rudin., "Modern Methods of Polymer Characterization." John Wiley & Sons. 1991, p. 103-112, New York.

Saam, J et al. Dow Coming. J. Am. Chem. Soc. (1961) 83(6) 1351.

Shearer et al., Free radical hydrosilylation of polypropylene. Journal of Applied Polymer Science. vol. 65, Issue 3, 439-447 (1997).

"Silicones", Apr. 15, 2003 (Apr. 15, 2003), Encyclopedia of Polymer Science and Techno, Wiley, US, pp. 765-841, XP007918236, pp. 801-805.

Spanos, et al., surface segregation, Macromolecules, 2003, 36 (2), pp. 368-372.

Tolinski, M.; Additives for Polyolefins 2015, chapter 7, p. 71.

Uozumi., "Synthesis of Functionalized Alternating Olefin Copolymer and Modificationto Graft Copolymer by Hydrosilylation." 2000, p. 923-1292.

Waddon., "Crystal Structure of Polyhedral OligomericSilsequioxane (POSS) Nano-materials: A Study by X-rayDiffraction and Electron Microscopy." 2003, p. 4555-4561, vol. 15.

Waddon., "Nanostructured Polyethylene-POSSCopolymers: Control of Crystallizationand Aggregation." 2002, p. 1149-1155, vol. 2, No. 10.

Zhang, H X, et al, "Prepareation and properties of propylene/POSS copolymer with rac-Et (Ind) 2ZrXI2 catalyst", European Polymer Journal, Pergamon Press Ltd. Oxford, GB, vol. 45, No. 1, Jan. 1, 2009 (Jan. 1, 2009), pp. 40-46, XP025869132.

Zheng, et al.; Novel Polyolefin Nanocomposites; Macromolecules 2001; 34, 8034- 8039.

* cited by examiner

| Sample | Description | Picture 120°C | Picture 30°C |
|---|---|---|---|
| Example 2 | PE (36%) – $T^{Me}$ | 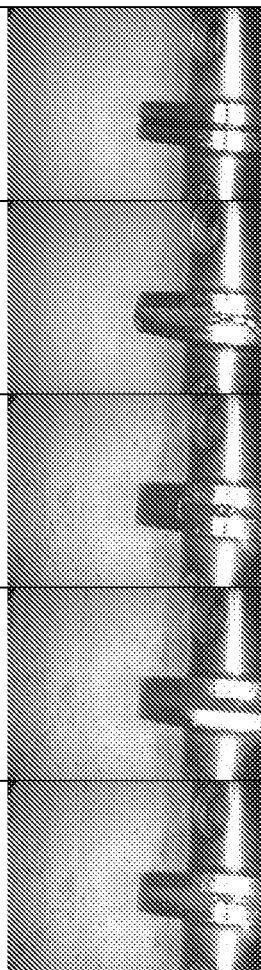 | 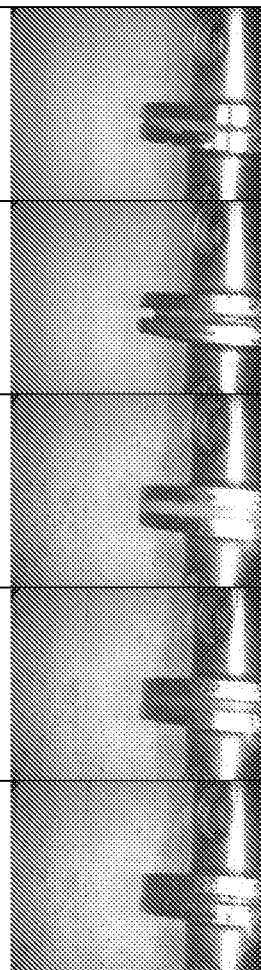 |
| Example 3 | PE (36%) - $T^{Ph}$ | 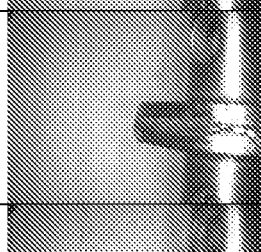 | 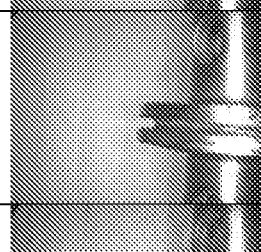 |
| Example 4 | PE (35%) – MQ | 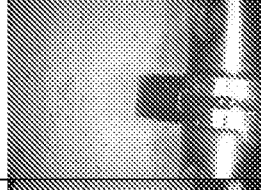 | 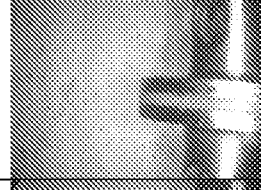 |
| Example 5 | PE (35%) – $T^{Ph}$ | 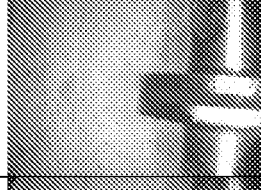 | 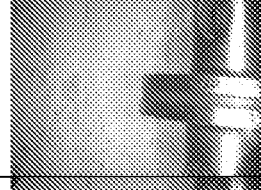 |
| Example 6 | $T^{Ph}$ – PE (20%) – $T^{Ph}$ | 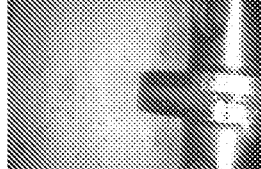 | 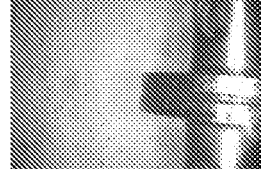 |

POLYSILOXANE RESIN-POLYOLEFIN COPOLYMER AND METHODS FOR THE PREPARATION AND USE THEREOF

This application is a U.S. national stage filing under 35 U.S.C. § 371 of PCT Application No. PCT/US19/026233 filed on 8 Apr. 2019, currently pending, which claims the benefit of U.S. Provisional Patent Application No. 62/699,192 filed 17 Jul. 2018 under 35 U.S.C. § 119 (e). PCT Application No. PCT/US19/026233 and U.S. Provisional Patent Application No. 62/699,192 are hereby incorporated by reference.

TECHNICAL FIELD

This invention relates to a copolymer of a polysiloxane resin and a polyolefin. The copolymer can be prepared by reacting a polyolefin having a silicon bonded hydrogen functional group and a polysiloxane resin having one or more silicon bonded groups, which are reactive with the silicon bonded hydrogen atom on the polyolefin in the presence of a catalyst.

BACKGROUND

Chain shuttling technology of The Dow Chemical Company provides a useful mechanism to form multiblock olefin block copolymers (OBCs) as well as OBCs with controlled block sequence distribution. In addition, chain shuttling technology can enable the synthesis of relatively exotic end-functional polyolefins. This technology involves polymerization of olefins in presence of a metal alkyl chain shuttling agent (CSA) such as diethyl zinc. If a large excess of the chain shuttling agent is utilized, the majority of chains initiated from the alkyl group from the CSA result in the majority of the chains functionalized by the CSA on one end while the other is bound to a metal cation. These polymeryl metals can either be further functionalized to produce a chain-end functional polyolefin derived at the metal cation chain end, or the complex can by hydrolyzed to leave a functional group on the opposite end, which was grown off of the CSA.

It is desirable to connect these silicon-containing functional groups to polysiloxanes via a linking group. The linking group can be a symmetric chain end, an inert chain end, or a chain end bound to an orthogonally reactive functional group. The polysiloxane and the polyolefin may be (mono)-end-functional or di-end-functional. Therefore, the resulting product can be a diblock (AB) polymer, a triblock (ABA or BAB) polymer, a multiblock (AB)$_n$ polymer, or a mixture thereof.

In previously reported attempts to react an Si—H functional polydiorganosiloxane with an alkenyl-terminated polyolefin, the catalyst caused undesired isomerization of the double bond to an internal position, thus deactivating it to hydrosilylation and limiting converSiOn. This led to copolymers containing unreacted homopolymers, limiting their industrial applicability.

SUMMARY

A polysiloxane resin-polyolefin copolymer may be prepared by a method comprising: combining starting materials comprising: A) a polyolefin having a silicon bonded hydrogen functional group of formula

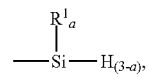

where each $R^1$ is an independently selected monovalent hydrocarbon group and subscript a is 1 or 2; B) a polysiloxane resin having a group reactive with the silicon bonded hydrogen of starting material A); and C) a catalyst.

The polysiloxane resin-polyolefin copolymer comprises:
I) a polyolefin block,
II) a polysiloxane resin block, and
III) a divalent linking group comprising a first silicon atom and a first oxygen atom, where the first silicon atom in the linking group is bonded to a carbon atom in the polyolefin block and the first oxygen atom in the linking group is bonded to a silicon atom in the polysiloxane resin block. The linking group has formula

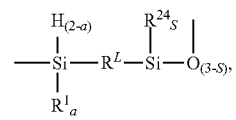

where each $R^1$ is an independently selected monovalent hydrocarbon group and each subscript a is independently 1 or 2, $R^L$ is a linking moiety, each $R^{24}$ is independently a monovalent hydrocarbon group of 1 to 30 carbon atoms or a hydrolyzable group, and subscript S is 0, 1 or 2.

BRIEF DESCRIPTION OF THE DRAWING

FIG. 1 shows pictures of some of the samples prepared as described in the EXAMPLES section.

DETAILED DESCRIPTION

The copolymer may be prepared by a method comprising:
1) combining starting materials comprising:
A) a polyolefin having a silicon bonded hydrogen functional group of formula

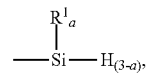

where each $R^1$ is an independently selected monovalent hydrocarbon group and subscript a is 1 or 2 (silyl functional polyolefin);
B) a polysiloxane resin having a group reactive with the silicon bonded hydrogen of starting material A); and
C) a catalyst.

The starting materials may optionally further comprise one or more additional starting materials selected from the group consisting of D) a solvent, E) a stabilizer, or both D) and E).

Step 1) may be performed by any convenient means such as mixing at a temperature of 50° C. to 200° C., alternatively 100° C. to 120° C., at ambient pressure. Step 1) may be performed by any convenient means, such as solution processing (i.e., dissolving and/or dispersing one or more of the other starting materials in D) the solvent and heating) or melt extruSiOn (e.g., when solvent is not used or is removed during processing). Step 1) may be performed under inert conditions, e.g., by purging the equipment to be used with an inert gas such as nitrogen before and/or during introduction of starting materials.

The method may optionally further comprise one or more additional steps. For example, the method may further comprise: 2) recovering the polysiloxane resin-polyolefin copolymer after step 1). Recovering may be performed by any convenient means such as stripping and/or distillation to unwanted materials, e.g., catalyst, solvent, by-products, and/or unreacted starting materials. Alternatively, recovering may be performed by precipitation of the polysiloxane resin-polyolefin copolymer in a non-solvent, thereby removing unwanted materials, optionally with water washing.

A) Silyl Functional Polyolefin

Starting material A) is a polyolefin having a silicon bonded hydrogen functional group formula (A-1):

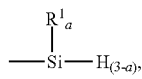

where each $R^1$ is an independently selected monovalent hydrocarbon group and each subscript a is independently 1 or 2. Suitable monovalent hydrocarbon groups for $R^1$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the monovalent hydrocarbon groups for $R^1$ may be selected from the group consisting of alkyl groups, alkenyl groups and aryl groups; alternatively alkyl and aryl; and alternatively alkyl. The alkyl groups are exemplified by methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms including cycloalkyl groups such as cyclopentyl and cyclohexyl. The alkenyl groups are exemplified by, but not limited to, vinyl, allyl, butenyl (including n-butenyl, iso-butenyl and t-butenyl), and hexenyl (including linear and branched isomers thereof). The aryl groups are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^1$ may be independently selected from the group consisting of alkyl and aryl, alternatively methyl and phenyl. Alternatively, each $R^1$ may be methyl.

In one embodiment of the method described above, A) the silyl functional polyolefin may have silyl groups of formula (A-1) in a pendant position. For example, the silyl functional polyolefin having pendant silyl groups may be an SiH functional silane grafted polyolefin comprising unit formula (A-2):

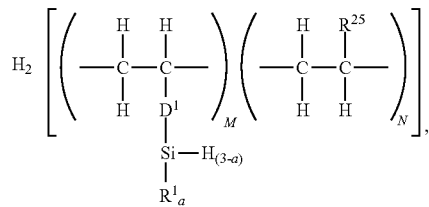

where $R^1$ and subscript a are as described above.

In this embodiment, Each $D^1$ is independently a divalent hydrocarbon group of 2 to 50 carbon atoms. Suitable divalent hydrocarbon groups for $D^1$ are exemplified by an alkylene group such as ethylene, propylene, butylene, hexylene, or octylene; an arylene group such as phenylene, or an alkylarylene group such as:

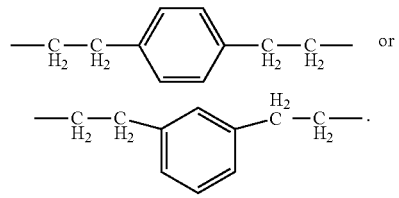

Alternatively, each $D^1$ is an alkylene group such as ethylene, propylene, or octylene.

In unit formula (A-2), each $R^{25}$ is independently H, a monovalent hydrocarbon group of 1 to 18 carbon atoms or a monovalent halogenated hydrocarbon group of 1 to 18 carbon atoms. Monovalent hydrocarbon groups suitable for $R^{25}$ are exemplified by those described herein for $R^1$ having 1 to 18 carbon atoms. Suitable monovalent halogenated hydrocarbon groups include haloalkyl groups, halogenated carbocyclic groups, and haloalkenyl groups. Haloalkyl groups include fluorinated alkyl groups such as trifluoromethyl (CF3), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4, 3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl 2,2-dichlorocyclopropyl, 2,3-dichlorocyclopentyl. Haloalkenyl groups include chloroallyl. Alternatively, each $R^{25}$ may be H or an alkyl group of 1 to 6 carbon atoms. Alternatively, each $R^{25}$ may be H.

In unit formula (A-2), subscript M is at least 1. Subscript N is at least 1. Alternatively, $1 \leq M \leq 10$. Alternatively, $10 \leq N \leq 20,000$. Alternatively, subscripts M and N may have values such that a quantity M/(M+N) may have a value such that $0.01$ mol $\% \leq M/(M+N) \leq 10$ mol $\%$. Alternatively, subscripts M and N may have values sufficient to provide the copolymer with a Mn of 1,000 to 500,000.

This silane grafted polyolefin may further comprise $R^{21}$ endblocking groups at each terminus. Each $R^{21}$ may independently be a saturated monovalent hydrocarbon group, such as an alkyl group (e.g., methyl) or an unsaturated monovalent hydrocarbon group having one or more double bonds (e.g., a monovalent hydrocarbon group comprising vinyl, vinyline, or vinylidene functionality). Examples of such silane grafted polyolefins and methods for their preparation are disclosed, for example, in U.S. Pat. No. 6,624,254. The silane grafted polyolefin may be used as starting material A) the silyl functional polyolefin in step 1) of the method described above.

In an alternative embodiment, A) the silyl functional polyolefin comprises a silyl terminated polyolefin having 1 to 2 terminal silyl groups of formula (A-1) per molecule. The silyl terminated polyolefin may have unit formula (A-3):

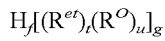

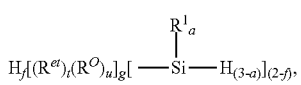

where subscript a and $R^1$ are as described above, subscript f is 0 to 1, subscripts t and u have relative values such that $0 < t \leq 1$, $0 \leq u \leq 1$, subscript g is 1 or more, each $R^{et}$ represents an ethylene unit, and each $R^O$ represents an olefin unit, other than ethylene. $R^O$ may be an alpha-olefin or a cyclic olefin. Examples of alpha-olefins are as described below and include ethylene, propylene, and octene. Examples of cyclic olefins are as described below and include ethylidenenorbornene, norbornene, vinyl norbornene, cyclohexene, and cyclopentene. Alternatively, subscript g may be 1 to 500, alternatively 10 to 400, and alternatively 18 to 360. Alternatively, subscript g may have a value sufficient to give the silyl terminated polyolefin a Mn of 500 to 50,000 g/mol, alternatively 500 to 10,000 g/mol.

Alternatively, the silyl terminated polyolefin may have unit formula (A-4):

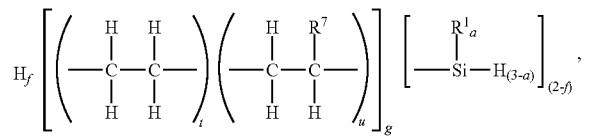

where subscripts a, f, g, t, and u, and $R^1$ are as described above. Each $R^7$ is independently a monovalent hydrocarbon group of 1 to 20 carbon atoms. The monovalent hydrocarbon group for $R^7$ may be alkyl, alkenyl or aryl; alternatively alkyl. Alternatively, $R^7$ may be an alkyl group of 2 to 12 carbon atoms, and alternatively 2 to 6 carbon atoms. Alternatively, each $R^7$ is a hexyl group.

The silyl terminated polyolefin may have one terminal silyl group per molecule (i.e., where subscript f=1). Examples of this silyl-terminated polyolefin having a silyl group at one end of the polymer chain include dimethyl, hydrogensilyl-terminated polyethylene; dimethyl,hydrogensilyl-terminated poly(ethylene/octene) copolymer; methyl, dihydrogensilyl-terminated polyethylene; methyl, dihydrogensilyl-terminated poly(ethylene/octene) copolymer; diphenylhydrogensilyl-terminated polyethylene; diphenylhydrogensilyl-terminated poly(ethylene/octene) copolymer; phenyldihydrogensilyl-terminated polyethylene; phenyldihydrogensilyl-terminated poly(ethylene/octene) copolymer; chlorophenylhydrogensilyl-terminated polyethylene; or chlorophenylhydrogensilyl-terminated poly(ethylene/octene) copolymer. This silyl terminated polyolefin can be prepared by the processes described in U.S. Patent Application Ser. 62/644,635, filed on Mar. 19, 2018 and U.S. Patent Application Ser. No. 62/644,624 filed on Mar. 19, 2018, which are both hereby incorporated by reference.

The silyl terminated polyolefin having one terminal silyl group per molecule may be prepared by a process comprising: 1) combining starting materials comprising: a) a polymeryl-metal, optionally b) a nitrogen containing heterocycle, and c) a halosilane; thereby forming a product comprising the silyl-terminated polyolefin. The starting materials may optionally further comprise d) a solvent. The process may optionally further comprise one or more additional steps selected from: 2) washing the product with water, and 3) recovering the product. The a) polymeryl-metal may be prepared by a process comprising combining starting materials comprising: i) an olefin monomer, ii) a catalyst, and iii) a chain shuttling agent of formula $R^F_O M$, where M is a metal atom from group 1, 2, 12, or 13 of the Period Table of Elements, each $R^F$ is independently a monovalent hydrocarbon group of 1 to 20 carbon atoms, and subscript O is 1 to the maximum valence of the metal selected for M. In certain embodiments, M may be a divalent metal, including but not limited to calcium (Ca), magnesium, and zinc (Zn), and in this embodiment subscript O=2. In certain embodiments, M may be a trivalent metal, including but not limited to aluminium (Al), boron (B), and gallium (Ga), and in this embodiment subscript O=3. Alternatively, M may be either Zn or Al; and alternatively Zn. The monovalent hydrocarbon group of 1 to 20 carbon atoms may be alkyl group (as defined herein), alternatively exemplified by ethyl, propyl, octyl, and combinations thereof.

Suitable olefin monomers are disclosed for example, at col. 16, lines 5-36 of U.S. Pat. No. 7,858,706 and at col. 12, lines 7 to 41 of U.S. Pat. No. 8,053,529, which are hereby incorporated by reference. Examples of suitable olefin monomers include straight chain or branched alpha-olefins of 2 to 30 carbon atoms, alternatively 2 to 20 carbon atoms, such as ethylene, propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; cycloolefins of 3 to 30, alternatively 3 to 20 carbon atoms such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene. Alternatively, starting material i) may comprise ethylene and optionally one or more olefin monomers other than ethylene, such as propylene or 1-octene. Alternatively, the olefin monomer may be ethylene and 1-octene. Alternatively, the olefin monomer may be ethylene. Suitable catalysts (and optional cocatalysts) are disclosed, for example, at col. 19, line 45 to col. 51, line 29 of U.S. Pat. No. 7,858,706, and col. 16, line 37 to col. 48, line 17 of U.S. Pat. No. 8,053,529, which are hereby incorporated by reference. Suitable chain shuttling agents include trialkyl aluminium and dialkyl zinc compounds, such as triethylaluminium, tri(isopropyl)aluminium, tri(isobutyl)aluminium, tri(n-hexyl)aluminium, tri(n-octyl) aluminium, triethylgallium, and diethylzinc. Suitable chain shuttling agents are disclosed at col. 16, line 37 to col. 19, line 44 of U.S. Pat. No. 7,858,706 and col. 12, line 49 to col. 14, line 40 of U.S. Pat. No. 8,053,529, which are hereby incorporated by reference.

The polymeryl-metal useful for preparing the silyl terminated polyolefin may be prepared using known process conditions and equipment, such as those disclosed in U.S. Pat. No. 7,858,706 to Arriola, et al. at col. 52, line 2 to col. 57, line 21 and U.S. Pat. No. 8,053,529 to Carnahan, et al.

The optional nitrogen containing heterocycle may be added, for example, when the polymeryl-metal is a polymeryl-zinc and the halosilane is a chlorosilane. The optional nitrogen containing heterocycle may have a general formula selected from the group consisting of:

b1)

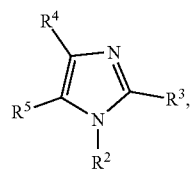

b2)

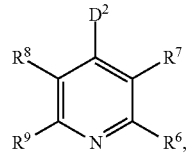

b3)

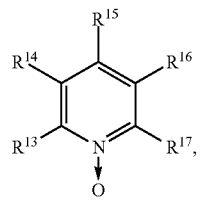

and mixtures of two or more of b1), b2), and b3), where in formulae b1), b2), and b3), where R² is a monovalent hydrocarbon group, R³ is a hydrogen atom or a monovalent hydrocarbon group, R⁴ is a hydrogen atom or a monovalent hydrocarbon group, R⁵ is a hydrogen atom or a monovalent hydrocarbon group, R⁶ is a hydrogen atom or a monovalent hydrocarbon group, R⁷ is a hydrogen atom or a monovalent hydrocarbon group, R⁸ is a hydrogen atom or a monovalent hydrocarbon group, R⁹ is a hydrogen atom or a monovalent hydrocarbon group, and D² is an amino functional hydrocarbon group or group of formula —NR¹¹₂, where each R¹¹ is a monovalent hydrocarbon group, R¹³ is a hydrogen atom or a monovalent hydrocarbon group, R¹⁴ is a hydrogen atom or a monovalent hydrocarbon group, R¹⁵ is a hydrogen atom or a monovalent hydrocarbon group, R¹⁶ is a hydrogen atom or a monovalent hydrocarbon group, and R¹⁷ is a hydrogen atom or a monovalent hydrocarbon group. Suitable hydrocarbon groups for R² to R¹⁷ may have 1 to 12 carbon atoms, alternatively 1 to 8 carbon atoms, alternatively 1 to 4 carbon atoms, and alternatively 1 to 2 carbon atoms. Alternatively, the hydrocarbon groups for R² to R¹⁷ may be alkyl groups. The alkyl groups are exemplified by methyl, ethyl, propyl (including branched and linear isomers thereof), butyl (including branched and linear isomers thereof), and hexyl; alternatively methyl. Alternatively, each R³ to R⁹ may be selected from the group consisting of hydrogen and methyl. Alternatively, each R¹³ to R¹⁷ may be hydrogen. The nitrogen containing heterocycle used as the basic additive in the process may be selected from the group consisting of:

b4)

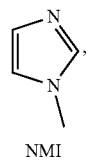

NMI b5)

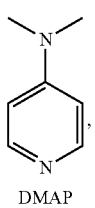

DMAP b6)

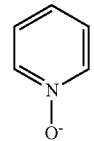

pyridine N-oxide, and mixtures of two or more of b4), b5), and b6).

When the nitrogen containing heterocycle is used, the resulting product may be recovered, e.g., by water washing to remove the nitrogen containing heterocycle before using the silyl-terminated polyolefin in the method for preparing the polyolefin-polydiorganosiloxane block copolymer described herein.

The halosilane may have formula $H_J R^{12}_K SiX_{(4-J-K)}$, where each $R^{12}$ is independently selected from hydrogen and a monovalent hydrocarbon group of 1 to 18 carbon atoms, each X is independently a halogen atom, subscript J is 1 to 3, subscript K is 0 to 2, with the proviso that a quantity (J+K)≤3. Examples of suitable halosilanes include, but are not limited to: dihalosilanes such as methylhydrogendichlorosilane, methylhydrogendiiodosilane, methylhydrogenchloroiodosilane, ethylhydrogendichlorosilane, ethylhydrogendibromosilane, ethylhydrogendiiodosilane, ethylhydrogenchloroiodosilane, propylhydrogendichlorosilane, propylhydrogendibromosilane, propylhydrogendiiodosilane, propylhydrogenchloroiodosilane, phenylhydrogendichlorosilane, phenylhydrogendiiodosilane, phenylhydrogendibromosilane, and mixtures thereof. Examples of suitable halosilanes further include, but are not limited to: monohalosilanes such as dimethylhydrogenchlorosilane, dimethylhydrogenbromosilane, dimethylhydrogeniodosilane, diethylhydrogenchlorosilane, diethylhydrogeniodosilane, dipropylhydrogenchlorosilane, dipropylhydrogenbromosilane, dipropylhydrogeniodosilane, diphenylhydrogenchlorosilane, diphenylhydrogeniodosilane, diphenylhydrogenbromosilane, and mixtures thereof. Alternatively, the halosilane may be selected from the group consisting of c1) dimethylhydrogenchlorosilane, c2) diphenylhydrogenchlorosilane, c3) phenyldihydrogenchlorosilane, c4) phenylhydrogendichlorosilane, c5) dimethylhydrogeniodosilane, and mixtures of two or more of c1), c2), c3), c4), and c5).

Starting material d) a solvent may optionally be used in step 1) of the process for making the silyl terminated polyolefin. The solvent may be a hydrocarbon solvent such as an aromatic solvent or an isoparaffinic hydrocarbon solvent. Suitable solvents include but are not limited to a non-polar aliphatic or aromatic hydrocarbon solvent selected from the group of pentane, hexane, heptane, octane, nonane, decane, undecane, dodecane, cyclopentane, methylcyclopentane, cyclohexane, methylcyclohexane, cycloheptane, cyclooctane, decalin, benzene, toluene, xylene, an isoparaffinic fluid including but not limited to Isopar™ E, Isopar™ G, Isopar™ H, Isopar™ L, Isopar™ M, a dearomatized fluid including but not limited to Exxsol™ D or isomers and mixtures of two or more thereof. Alternatively, the solvent may be toluene and/or Isopar™ E.

Alternatively, starting material A), the silyl terminated polyolefin, may have two silyl terminal groups per molecule (i.e., in formulae (A-3) and (A-4) where subscript f=0, the silyl terminated polyolefin is telechelic. Such telechelic silyl terminated polyolefins may be prepared by methods, such as those disclosed in U.S. Patent Application Ser. No. 62/644,808, filed on Mar. 19, 2018, which is hereby incorporated by reference. Telechelic silyl terminated polyolefins may be prepared, for example, by a process comprising: 1) combining starting materials comprising a') a silicon-terminated organo-metal and c) the halosilane (as described above), thereby obtaining a product comprising the silyl-terminated polyolefin. In further embodiments, the starting materials of this process may further comprise b) the nitrogen containing heterocycle (as described above). The starting materials of this process may optionally further comprise d) the solvent (as described above).

The process may optionally further comprise one or more additional steps. For example, the process may further comprise: 2) recovering the telechelic silyl terminated polyolefin. Recovering may be performed by any suitable means, such as precipitation and filtration, optionally with water washing, thereby removing unwanted materials.

The amount of each starting material depends on various factors, including the specific selection of each starting material. However, in certain embodiments, a molar excess of starting material c) may be used per molar equivalent of starting material a'). For example, the amount of starting material c) may be 2 to 3 molar equivalents per molar equivalent of starting material a'). If starting material b) is used, the amount of starting material b) may be 2 molar equivalents per molar equivalent of starting material a').

The amount of d) solvent will depend on various factors, including the selection of starting materials a'), c), and, if present, b). However, the amount of d) solvent may be 65% to 95% based on combined weights of all starting materials used in step 1).

Starting material a') may be a silicon-terminated organo-metal having the formula (II) or (III):

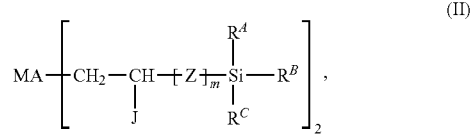

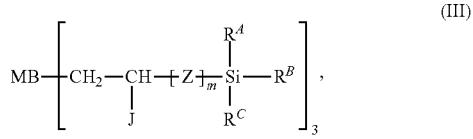

where

MA is a divalent metal selected from the group consisting of Zn, Mg, and Ca;

MB is a trivalent metal selected from the group consisting of Al, B, and Ga;

each Z is an independently selected divalent hydrocarbon group of 1 to 20 carbon atoms;

subscript m is a number from 1 to 100,000;

each J is independently a hydrogen atom or a monovalent hydrocarbon group of 1 to 20 carbon atoms;

each $R^A$, $R^B$, and $R^C$ is independently selected from the group consisting of a hydrogen atom, a monovalent hydrocarbon group of 1 to 10 carbon atoms, a vinyl group, an alkoxy group, or one or more siloxy units selected from M, D, and T units:

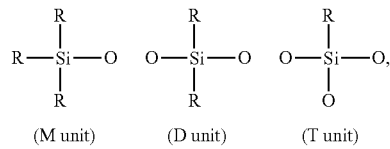

wherein each R is independently a hydrogen atom, a monovalent hydrocarbon group of 1 to 10 carbon atoms, or cyclic, a vinyl group, or an alkoxy group;

two or all three of $R^A$, $R^B$, and $R^C$ may optionally be bonded together to form a ring structure when two or all three of $R^A$, $R^B$, and $R^C$ are each independently one or more siloxy units selected from D and T units.

In certain embodiments, subscript m of formulas (II) and (III) is a number from 1 to 75,000, from 1 to 50,000, from 1 to 25,000, from 1 to 10,000, from 1 to 5,000, from 1 to 2,500, and/or from 1 to 1,000.

In certain embodiments of formula (II), MA is Zn. In certain embodiments of formula (III), MB is Al. In further embodiments of formula (II), J is an ethyl group. In further embodiments of formula (III), J is a hydrogen atom.

Prior to this process, the silicon-terminated organo-metal may be prepared according to the disclosures of U.S. Patent Application Nos. 62/644,654 and 62/644,664 both filed on Mar. 19, 2018, which are both hereby incorporated by reference.

For example, in certain embodiments, the silicon-terminated organo-metal may be prepared by a process comprising combining starting materials comprising: (a) a vinyl-terminated silicon-based compound, (b) a chain shuttling agent, (c) a procatalyst, (d) an activator, (e) an optional solvent, and (f) an optional scavenger, thereby obtaining a product comprising the silicon-terminated organo-metal.

Alternatively, the silicon terminated organo-metal may be prepared by a process comprising combining starting materials at an elevated temperature, the starting materials comprising: (a) the vinyl-terminated silicon-based compound, (b) the chain shuttling agent, and optionally (e) the solvent. This process may be conducted at a temperature of 60° C. to 200° C., alternatively 80° C. to 180° C., and alternatively 100° C. to 150° C. This process may be conducted for a duration of from 30 minutes to 200 hours.

In certain embodiments, (a) the vinyl-terminated silicon-based compound may have the formula (IV):

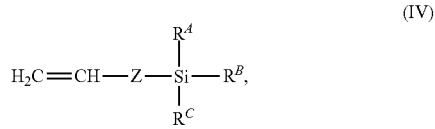

where Z, $R^A$, $R^B$, and $R^C$ are as described above.

In certain embodiments, the (b) chain shuttling agent may have the formula $R^F{}_OM$, where $R^F$, M, and subscript O are as described above.

In certain embodiments, (c) the procatalyst may be any compound or combination of compounds capable of, when combined with an activator, polymerization of unsaturated monomers. Suitable procatalysts include but are not limited to those disclosed in WO 2005/090426, WO 2005/090427, WO 2007/035485, WO 2009/012215, WO 2014/105411, WO 2017/173080, U.S. Patent Publication Nos. 2006/0199930, 2007/0167578, 2008/0311812, and U.S. Pat. Nos.

7,355,089 B2, 8,058,373 B2, and 8,785,554 B2. The nitrogen containing heterocycle and the halosilane are as described above for starting materials b) and c) used to make the silyl terminated polyolefin having one terminal silyl group per molecule.

In certain embodiments, the (d) activator may be any compound or combination of compounds capable of activating a procatalyst to form an active catalyst composition or system. Suitable activators include but are not limited to Brønsted acids, Lewis acids, carbocationic species, or any activator known in the art, including but limited to those disclosed in WO 2005/090427 and U.S. Pat. No. 8,501,885 B2. In exemplary embodiments, the co-catalyst is [$(C_{16-18}H_{33-37})_2CH_3NH$] tetrakis(pentafluorophenyl)borate salt.

In certain embodiments, the (e) optional solvent may be any solvent disclosed above as starting material (d) or as described below.

In further embodiments, the silicon-terminated organo-metal prepared by the processes described above may be followed by a subsequent polymerization step. Specifically, the silicon-terminated organo-metal prepared by the processes as described above may be combined with at least one olefin monomer, a procatalyst as defined herein, an activator as defined herein, and optional materials, such as solvents and/or scavengers, under polymerization process conditions known in the art, including but not limited to those disclosed in U.S. Pat. Nos. 7,858,706 and 8,053,529. Such a polymerization step essentially increases the subscript n in the formula (I) and the subscript m in formulas (II) and (III). Examples of suitable olefin monomers for use in the polymerization step are as described above.

As described below, the silicon-terminated organo-metal may also be prepared by combining starting materials comprising 6-bromo-1-hexene, THF, and chlorodimethylsilane ($Me_2HSiCl$) to form hex-5-en-1-yldimethylsilane, followed by combining hex-5-en-1-yldimethylsilane, triethylborane, a borane-dimethylsulfide complex, and diethyl zinc to form the silicon terminated organo-metal.

Alternatively, the silicon-terminated organo-metal may be prepared in a batch reactor using a process as described below in Reference Example H, by varying appropriate starting materials, i.e., the olefin monomers, catalysts, chain shuttling agents, catalysts, procatalysts, activators, and solvents, suitable examples of which are described herein. Step 1) of combining the starting materials may be performed by any suitable means, such as mixing at a temperature of 50° C. to 200° C., alternatively 100° C. to 120° C., at ambient pressure. Heating may be performed under inert, dry conditions. In certain embodiments, step 1) of combining the starting materials may be performed for a duration of 30 minutes to 20 hours, alternatively 1 hour to 10 hours. In further embodiments, step 1) of combining the starting materials may be performed by solution processing (i.e., dissolving and/or dispersing the starting materials in (d) solvent and heating) or melt extruSiOn (e.g., when (d) solvent is not used or is removed during processing).

The silicon-terminated organo-metal prepared as described above for starting material a') may then be combined with c) the halosilane, and optionally b) the nitrogen containing heterocycle, and/or d) the solvent, which are as described above thereby producing the telechelic silyl terminated polyolefin.

Alternatively, the silyl terminated polyolefin suitable for use as starting material A) may be prepared in a solution polymerization process, wherein the polyolefin polymer is made by a method comprising: a) combining i) the olefin monomer, ii) the catalyst, and the iii) chain shuttling agent described above to prepare iv) a polymeryl metal; b) combining iv) the polymeryl-metal, v) the halosilane, and optionally v) the nitrogen containing heterocycle; where steps a) and b) are performed in a solution. In the solution, the resulting silyl terminated polyolefin may comprise 10% to 20% of the total weight of the reaction mixture. The balance typically comprises unreacted olefin monomer and an unreactive solvent. Commercial processes are typically done in a continuous reactor, where fresh olefin monomer and catalyst are continuously fed to reach a steady state converSiOn to polyolefin, and the polyolefin is removed at a rate commensurate with these feeds and the converSiOn to polyolefin. In these systems, the olefin monomer is not completely converted to polyolefin. For example, in the case of a copolymerization of ethylene and an alpha-olefin, the effluent from the reactor typically contains unreacted monomers, 10% of the ethylene and >50% of the alpha-olefin. After polymerization, the solvent and unreacted monomers may be removed by a devolatilization process to leave solid silyl terminated polyolefin.

After devolatilization of the silyl terminated polyolefin, the starting materials comprising the A) silyl terminated polyolefin, B) the polysiloxane resin, and C) the catalyst may be combined in step 1) of the method described above for making the polyolefin-polysiloxane resin copolymer. Alternatively, in one embodiment where a Lewis acid catalyst is used as starting material C), the devolatilization step may be eliminated, i.e., the mixture formed after step b) may be used to deliver starting material A) the silyl terminated polyolefin in step 1) of the method described herein. This method for preparing the polysiloxane resin-polyolefin copolymer described herein may provide the advantage that coupling the polysiloxane resin with the silyl terminated polyolefin may be conducted in the presence of the unreacted olefinic monomers (e.g., in solution, without the devolatilization of the silyl terminated polyolefin as described above). In this type of system, the polysiloxane resin could be fed into a second reactor along with the effluent from the continuous reactor described above for making the silyl terminated polyolefin. The chemistry in the second reactor would not involve reaction of the olefin and, therefore, it is expected this could be conducted in the presence of olefinic monomers without detrimental effect on coupling efficiency. This represents a benefit over prior processes, in which the unreacted monomer from the continuous reactor presented a challenge for doing the coupling through hydrosilylation in a second reactor before devolatilization. In this prior process, concentration of the free olefinic monomer was much higher than the concentration of a vinyl-terminated polyolefin, and therefore the coupling efficiency was poor between the siloxane and polyolefin, unless the olefin monomer was removed before this second reaction. The present invention may provide the benefit of enabling efficient coupling in a second reactor in solution, and then the resulting polysiloxane resin-polyolefin copolymer may be devolatilized. Therefore, in one embodiment of the invention, the method may further comprise: i) forming A) the silyl terminated polyolefin described herein, in a mixture with unreacted monomer and optionally solvent, and ii) combining the mixture, B) the polysiloxane resin described herein, and C) a Lewis Acid catalyst in step 1) of the method described herein.

Starting material A) may be one silyl functional polyolefin or may comprise two or more silyl functional polyolefins differing in at least one of the following properties: structure, viscosity, average molecular weight, olefin blocks, and sequence. Alternatively, starting material A) may comprise a mixture of silyl terminated polyolefins, wherein both a silyl terminated polyolefin having one terminal silyl group per molecule (mono-terminated silyl terminated polyolefin) and a telechelic silyl terminated polyolefin are used in the mixture for starting material A).

The amount of starting material A) used in step 1) of the method for making the copolymer described herein will depend on various factors including whether a silyl functional polyolefin with a pendant or a terminal silyl group is used, whether a mixture of mono-terminated silyl terminated polyolefin and telechelic silyl terminated polyolefin is used, the desired architecture of the polysiloxane resin-polyolefin copolymer to be formed, and the selection of starting material B), however, the amount of starting material A) may be 5% to 95% based on combined weights of all starting materials combined in step 1). Alternatively, the amount of starting material A) may be 10% to 60%, alternatively 10% to 40%, and alternatively 15% to 35%, on the same basis.

B) Polysiloxane Resin

Starting material B) in the method described herein is a polysiloxane resin. The polysiloxane resin may have unit formula B-1): $(R^{24}_3SiO_{1/2})_A(R^{24}_2SiO_{2/2})_B(R^{24}SiO_{3/2})_C(SiO_{4/2})_D$, where subscripts A, B, C, and D have values such that $0 \le A \le 0.6$, $0 \le B \le 0.5$, $0 \le C \le 1$, $0 \le D \le 1$, with the provisos that a quantity (C+D)>0 and when D>) then A>0. In the polysiloxane resin, each $R^{24}$ is independently a monovalent hydrocarbon group of 1 to 30 carbon atoms or a hydrolyzable group (e.g., a hydroxyl group or an alkoxy group). At least one $R^{24}$ per molecule is a hydrolyzable group or an aliphatically unsaturated monovalent hydrocarbon group. Suitable hydrolyzable groups include hydroxyl; alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy. Suitable aliphatically unsaturated monovalent hydrocarbon groups include alkenyl such as vinyl, allyl and hexenyl; and alkynyl. The monovalent hydrocarbon groups for $R^{24}$ may be as described above for $R^1$.

The polysiloxane resin may be B-2) a polyorganosilicate resin or B-3) a silsesquioxane resin. The polyorganosilicate resin comprises monofunctional units ("M" units) of formula $R^{24}_3SiO_{1/2}$ and tetrafunctional silicate units ("Q" units) of formula $SiO_{4/2}$, where each $R^{24}$ is independently a monovalent hydrocarbon group of 1 to 30 carbon atoms or a hydrolyzable group (e.g., a hydroxyl group or an alkoxy group), with the proviso that at least one $R^{24}$ per molecule is a hydrolyzable group or an aliphatically unsaturated monovalent hydrocarbon group. Alternatively, in the polyorganosilicate resin, the monovalent hydrocarbon group for $R^{24}$ may be independently selected from the group consisting of alkyl, alkenyl and aryl, such as those described above for $R^1$. Alternatively, the monovalent hydrocarbon group for $R^{24}$ may be selected from methyl, vinyl and phenyl. Alternatively, at least one-third, alternatively at least two thirds of the $R^{24}$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula Si(O-SiR$^{24}_3$)$_4$, where R$^{24}$ is as described above, e.g., the neopentamer may be tetrakis(trimethylsiloxy)silane. $^{29}$Si NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1, alternatively 0.6:1 to 0.9:1.

The MQ silicone resin may contain 2.0% or less, alternatively 0.7% or less, alternatively 0.3% or less, of terminal units represented by the formula X"SiO$_{3/2}$, where X" represents a hydrolyzable group such as hydroxyl; alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy. The concentration of silanol groups present in the silicone resin can be determined using FTIR.

The Mn to achieve the desired flow characteristics of the MQ silicone resin can depend at least in part on the Mn of the silicone resin and the type of hydrocarbon group, represented by $R^{24}$, that are present in this starting material. The Mn of the MQ silicone resin is typically greater than 3,000 Da, alternatively >3,000 Da to 8,000 Da, and alternatively 4,500 to 7,500 Da.

The MQ silicone resin can be prepared by any suitable method. Silicone resins of this type have reportedly been prepared by cohydrolysis of the corresponding silanes or by silica hydrosol capping methods known in the art. Briefly stated, the method involves reacting a silica hydrosol under acidic conditions with a hydrolyzable triorganosilane such as trimethylchlorosilane, a siloxane such as hexamethyldisiloxane, or a combination thereof, and recovering a product comprising M and Q units (MQ resin). The resulting MQ resins may contain from 2 to 5 percent by weight of silicon-bonded hydroxyl groups.

The intermediates used to prepare the polyorganosilicate resin may be triorganosilanes and silanes with four hydrolyzable substituents or alkali metal silicates. The triorganosilanes may have formula $R^{24}_3SiX^1$, where $R^{24}$ is as described above and $X^1$ represents a hydrolyzable substituent such as that described above for X". Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically contain silicon bonded hydroxyl groups, i.e., of formulae, HOSi$_{3/2}$ and/or HOR$^{24}_2$SiO$_{1/2}$. The polyorganosilicate resin may comprise up to 2% of silicon bonded hydroxyl groups, as measured by FTIR spectroscopy. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

In one embodiment, the polyorganosilicate resin may further comprises 2% or less, alternatively 0.7% or less, and alternatively 0.3% or less, and alternatively 0.3% to 0.8% of units represented by formula X"SiO$_{3/2}$ and/or X"R$^{24}_2$SiO$_{1/2}$ where X" and $R^{24}$ are as described above. The concentration of silanol groups present in the polyorganosiloxane may be determined using FTIR spectroscopy.

In one embodiment, starting material B) comprises B-2) a polyorganosilicate resin comprising unit formula $(R^{24}_3SiO_{1/2})_c(R^{24}_2SiO_{2/2})_d(SiO_{4/2})_e$, where subscripts c, d, and e have values such that $0<c<0.6$, $0\le d<0.5$, $0.4<e<1$; and $R^{24}$ is independently selected from the group consisting of a monovalent hydrocarbon group of 1 to 30 carbon atoms or a hydrolyzable group, with the proviso that at least one $R^{24}$ per molecule is a hydrolyzable group. Alternatively, the hydrolyzable group for $R^{24}$ is selected from a hydroxyl group or an alkoxy group, such as methoxy or ethoxy.

Alternatively, the polyorganosilicate resin may have terminal aliphatically unsaturated groups. The polyorganosilicate resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

In an alternative embodiment, starting material B) comprises B-3) a polyorganosilicate comprising unit formula $(R^{24}_3SiO_{1/2})_{cc}(R^{24}_2SiO_{2/2})_{dd}(SiO_{4/2})_{ee}$, where subscripts cc, dd, and ee have values such that $0<cc<0.6$, $0\le dd<0.5$, $0.4<ee<1$; each $R^{24}$ is independently selected from the group consisting of a monovalent hydrocarbon group of 1 to 30 carbon atoms or a hydrolyzable group, with the proviso that at least one $R^{24}$ per molecule is a monovalent hydrocarbon group having terminal aliphatic unsaturation.

Various suitable polyorganosilicate resins are commercially available from sources such as Dow Silicones Corporation of Midland, Mich., U.S.A., Momentive Performance Materials of Albany, N.Y., U.S.A., and Bluestar Silicones USA Corp. of East Brunswick, N.J., U.S.A. For example, DOWSIL® MQ-1600 Solid Resin, DOWSIL® MQ-1601 Solid Resin, and DOWSIL® 1250 Surfactant, DOWSIL® 7466 Resin, and DOWSIL® 7366 Resin, all of which are commercially available from Dow Silicones Corporation of Midland, Mich., USA, are suitable for use in the methods described herein. Alternatively, a resin containing M, T, and Q units may be used, such as DOWSIL® MQ-1640 Flake Resin, which is also commercially available from Dow Silicones Corporation. Such resins may be supplied in organic solvent.

Alternatively, the polysiloxane resin may comprise B-3) a silsesquioxane resin, i.e., a resin comprising T units of formula $(R^{24}SiO_{3/2})$, where $R^{24}$ is as described above. Silsesquioxane resins suitable for use herein are known in the art and are commercially available. For example, a methylmethoxysiloxane methylsilsesquioxane resin having a DP of 15 and a weight average molecular weight (Mw) of 1200 g/mol is commercially available as DOWSIL® US-CF 2403 Resin from Dow Silicones Corporation of Midland, Mich., U.S.A. Alternatively, the silsesquioxane resin may have phenylsilsesquioxane units, methylsilsesquioxane units, or a combination thereof. Such resins are known in the art and are commercially available as DOWSIL® 200 Flake resins, also available from Dow Silicones Corporation. Alternatively, the silsesquioxane resin may further comprise D units of formulae $(R^{24}_2SiO_{2/2})$ and/or $(R^{24}X"SiO_{2/2})$ and T units of formulae $(R^{24}SiO_{3/2})$ and/or $(X"SiO_{3/2})$, i.e., a DT resin, where $R^{24}$ and X" are described above. DT resins are known in the art and are commercially available, for example, methoxy functional DT resins include DOWSIL® 3074 and DOWSIL® 3037 resins; and silanol functional resins include DOWSIL® 800 Series resins, which are also commercially available from Dow Silicones Corporation. Other suitable resins include DT resins containing methyl and phenyl groups.

In an alternative embodiment, starting material B) may comprise a silsesquioxane resin of unit formula B-4): $(R^{24}_3SiO_{1/2})_f(R^{24}_2SiO_{2/2})_g(R^{24}SiO_{3/2})_h(SiO_{4/2})_i$, where subscripts f, g, h, and i have values such that $0\le f<0.5$, $0\le g<0.5$, $0.5<h\le 1$, $0\le i<0.2$, and each $R^{24}$ is independently selected from the group consisting of a hydrocarbon group of 1 to 30 carbon atoms and a hydrolyzable group, with the proviso that at least one $R^{24}$ per molecule is a monovalent hydrocarbon group having terminal aliphatic unsaturation. Alternatively, the monovalent hydrocarbon group having terminal aliphatic unsaturation for $R^{24}$ may be an alkenyl group selected from the group consisting of vinyl, allyl, and hexenyl.

Starting material B) may be one polysiloxane resin or may comprise two or more polysiloxane resins differing in at least one of the following properties: structure, viscosity, average molecular weight, siloxane units, and sequence. Alternatively, starting material B) may comprise a mixture of two or more polyorganosilicate resins. Alternatively, starting material B) may comprise a mixture of two or more silsesquioxane resins.

The amount of starting material B) used in step 1) of the method for making the copolymer described herein will depend on various factors including whether a mixture of polysiloxane resins is used, the desired architecture of the polysiloxane resin-polyolefin copolymer to be formed, and the selection of starting material A), however, the amount of starting material B) may be 5% to 95%, alternatively 40% to 90%, alternatively 60% to 90%, alternatively 65% to 85%, based on combined weights of all starting materials combined in step 1).

C) Catalyst

Starting material C) is a catalyst capable of catalyzing reaction of the silicon bonded hydrogen atom in starting material A) and the reactive group of starting material B). Starting material C) may be C-1) a Lewis Acid catalyst or C-2) a hydrosilylation reaction catalyst. Starting material C) may be a Lewis Acid catalyst when starting material B) has hydrolyzable substituents (e.g., silanol groups or other hydrolyzable groups). Lewis Acid catalysts, such as those containing boron are suitable. Alternatively, the Lewis Acid catalyst may be a trivalent boron compound with at least one perfluoroaryl group, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10, and alternatively 6 carbon atoms. For example, the Lewis Acid catalyst may be selected from $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B\text{—}CH_2CH_2Si(CH_3)$. Alternatively, starting material C) may be a Piers-Rubinsztajn reaction catalyst of formula $B(C_6F_5)_3$, tris(pentafluorophenyl)borane.

In this embodiment, the amount of Lewis Acid catalyst used in step 1) of the method described herein will depend on various factors including the selection of starting materials A) and B) and their respective contents of silicon bonded hydrogen atoms and hydrolyzable substituents and the temperature during step 1), however, the amount of catalyst is sufficient to catalyze reaction of starting materials comprising A) and B), alternatively the amount of catalyst is sufficient to provide 0.0001 to 0.1 molar equivalents of catalyst per molar equivalent of hydrolyzable substituents of starting material B), alternatively 0.001 to 0.1, and alternatively 0.005 to 0.05 molar equivalents, on the same basis. The amounts for the catalyst are taken from the description of the linear polyolefin-polydiorganosiloxane copolymer.

Alternatively, starting material C) may be a hydrosilylation reaction catalyst when starting material B) has aliphatically unsaturated groups, such as alkenyl groups. Hydrosilylation reaction catalysts are known in the art and are commercially available. Hydrosilylation reaction catalysts include platinum group metal catalysts. Such hydrosilylation catalysts can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation catalysts and methods of preparing them are known in the art, as exemplified in U.S. Pat. Nos. 4,766,176 and 5,017,654.

In this embodiment, the amount of hydrosilylation reaction catalyst used herein will depend on various factors including the selection of starting materials A) and B) and their respective contents of silicon bonded hydrogen atoms and terminally aliphatically unsaturated groups, and whether an inhibitor is present, however, the amount of catalyst is sufficient to catalyze hydrosilylation reaction of SiH and aliphatically unsaturated groups, alternatively the amount of catalyst is sufficient to provide 1 ppm to 1000 ppm of the platinum group metal based on combined weights of all starting materials, alternatively 5 ppm to 100 ppm, on the same basis.

D Solvent

Starting material D) may optionally be added during the method for making the copolymer described above. The solvent may be an organic solvent, exemplified by D-1) a ketone such as acetone, methylethyl ketone, or methyl isobutyl ketone; D-2) an aromatic hydrocarbon such as benzene, toluene, or xylene; D-3) an aliphatic hydrocarbon such as heptane, hexane, or octane; D-4) a glycol ether such as propylene glycol methyl ether, dipropylene glycol methyl ether, propylene glycol n-butyl ether, propylene glycol n-propyl ether, or ethylene glycol n-butyl ether; D-5) a halogenated hydrocarbon such as dichloromethane, 1,1,1-trichloroethane or methylene chloride; D-6) chloroform; D-7) dimethyl sulfoxide; D-8) dimethyl formamide; D-9) acetonitrile; D-10) tetrahydrofuran; D-11) white spirits; D-12) mineral spirits; D-13) naphtha; D-14) an isoparaffin such as Isopar™ E commercially available from ExxonMobil Chemical Company; or a combination of two or more of D-1), D-2), D-3), D-4), D-5), D-6), D-7), D-8), D-9), D-10), D-11), D-12), D-13), and D-14).

The amount of solvent will depend on various factors including the type of solvent selected and the amount and type of other starting materials selected for use in step 1) of the method the polyolefin-polyorganosiloxane resin copolymer described herein. However, when present, the amount of solvent may range from 1% to 99%, alternatively 2% to 50%, based on combined weights of all starting materials combined in step 1). The solvent can be added during combining the starting materials comprising A), B), and C), for example, to aid mixing and delivery. Alternatively, one or more of the starting materials (such as the polysiloxane resin) may be dissolved in the solvent before combining with the other starting materials in step 1) of the method described herein.

E) Stabilizer

A stabilizer may optionally be added. Without wishing to be bound by theory, it is thought that the thermal stabilizer may be used to stabilize the polyolefin. The stabilizer may comprise E-1) an antioxidant, E-2) a UV absorber, E-3) a UV stabilizer, E-4) a heat stabilizer, or E-5) a combination of two or more of E-1), E-2), E-3), and E-4). Suitable antioxidants are known in the art and are commercially available. Suitable antioxidants include phenolic antioxidants and combinations of phenolic antioxidants with stabilizers. Phenolic antioxidants include fully sterically hindered phenols and partially hindered phenols; and sterically hindered amines such as tetramethyl-piperidine derivatives. Suitable phenolic antioxidants include vitamin E and IRGANOX® 1010 from Ciba Specialty Chemicals, U.S.A. IRGANOX® 1010 comprises pentaerythritol tetrakis(3-(3, 5-di-t-butyl-4-hydroxyphenyl)propionate). Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and a combination thereof (TINUVIN® 272). These and other TINUVIN® additives, such as TINUVIN® 765 are commercially available from Ciba Specialty Chemicals of Tarrytown, N.Y., U.S.A. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may alternatively be used, for example, to minimize potential for migration of the stabilizer out of the composition or the cured product thereof. An example of an oligomeric antioxidant stabilizer (specifically, hindered amine light stabilizer (HALS)) is Ciba TINUVIN® 622, which is a dimethylester of butanedioic acid copolymerized with 4-hydroxy-2,2,6,6-tetramethyl-1-piperidine ethanol. Heat stabilizers may include iron oxides and carbon blacks, iron carboxylate salts, cerium hydrate, barium zirconate, cerium and zirconium octoates, and porphyrins.

The amount of stabilizer depends on various factors including the type of stabilizer selected and the benefit desired. However, the amount of stabilizer may range from 0 to 5%, alternatively 0.1% to 4%, and alternatively 0.5% to 3%, based on the weight of all starting materials.

Copolymer

The polysiloxane resin-polyolefin copolymer prepared as described above comprises:
I) a polyolefin block,
II) a polysiloxane resin block, and
III) a divalent linking group comprising a silicon atom and a terminal oxygen atom, where the silicon atom in the linking group is bonded to a carbon atom in the polyolefin block and the oxygen atom in the linking group is bonded to a silicon atom in the polysiloxane resin block.

In one embodiment of the copolymer, the polyolefin block is derived from the silyl terminated polyolefin described above. In this embodiment, I) the polyolefin block may have unit formula $H_f[(R^{et})_t(R^O)_u]_g$, where $R^{et}$, $R^O$, and subscripts f, t, u and g are as described above. Alternatively, the polyolefin block may comprise units of formula $H_f[(C_2H_4)_t(CH_2CHR^7)_u]_g$, where each $R^7$ is independently a monovalent hydrocarbon group of 1 to 20 carbon atoms, subscript f is 0 to 1, subscripts t and u have relative values such that $0<t\le1$, $0\le u\le1$, subscript g is 1 or more.

Alternatively, the polyolefin block may be derived from the silyl functional polyolefin having the silyl group in pendant positions. In this embodiment, I) the polyolefin block may have unit formula

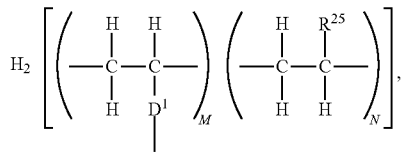

where each $R^{25}$ is independently selected from the group consisting of a hydrogen atom, a monovalent hydrocarbon group of 1 to 18 carbon atoms, and a monovalent halogenated hydrocarbon group of 1 to 18 carbon atoms, each $D^1$ is independently a divalent hydrocarbon group, and subscripts M and N have values such that $M\le1$ and $N\le1$ (alternatively $1\le M\le10$ and $10\le N\le20,000$).

In the copolymer, II) the polysiloxane resin block comprises units of formula $(R^{24}_3SiO_{1/2})_W(R^{24}_2SiO_{2/2})_X(R^{24}SiO_{3/2})_Y(SiO_{4/2})_Z$, where $R^{24}$ is as described above, and subscripts W, X, Y, and Z have values such that $W\ge0$, $X\ge0$, and $(Y+Z)>1$, as described above.

In the copolymer, III) the linking group has formula

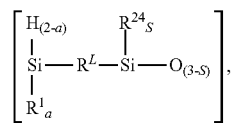

where subscript $R^1$, $R^{24}$, $R^L$ and subscript a are as described above, and subscript S is 0, 1, or 2. The linking moiety, $R^L$, is an oxygen atom when a Lewis Acid catalyst is used to make the copolymer using a resin having hydrolyzable groups. Alternatively, $R^L$ is a divalent hydrocarbon group when a hydrosilylation reaction catalyst is used to make the copolymer using a polysiloxane resin having aliphatically unsaturated groups.

In one embodiment, a mono-silyl terminated polyolefin may be used as starting material A) and an MQ resin may be used as starting material B) in the method described above. In this embodiment, the copolymer comprises unit formula (PR1):

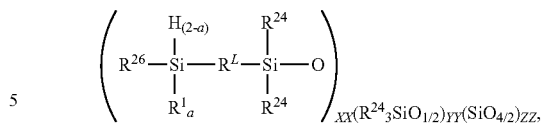

$_{XX}(R^{24}_3SiO_{1/2})_{YY}(SiO_{4/2})_{ZZ}$, where $R^1$, $R^{24}$, $R^L$, subscript a are as described above, subscript XX>0, subscript YY≥0, and subscript ZZ>1, and $R^{26}$ is a polyolefin terminated with one hydrogen atom (derived from mono-silyl terminated polyolefin).

In an alternative embodiment, a mono-silyl terminated polyolefin may be used as starting material A) and a silsesquioxane may be used as starting material B) in the method described above. In this embodiment, the copolymer comprises unit formula (PR2):

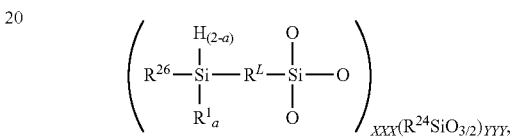

$_{XXX}(R^{24}SiO_{3/2})_{YYY}$, where $R^1$, $R^{24}$, $R^{26}$, $R^L$, and subscript a are as described above, and subscript XXX>0, subscript YYY≥0.

In an alternative embodiment, a telechelic silyl terminated polyolefin may be used as starting material A) and an MQ resin may be used as starting material B) in the method described above. In this embodiment, the copolymer comprises unit formula (PR3):

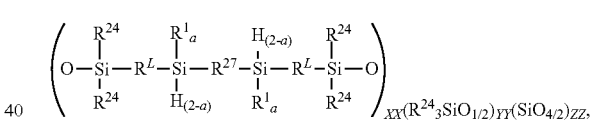

$_{XX}(R^{24}_3SiO_{1/2})_{YY}(SiO_{4/2})_{ZZ}$, where $R^1$, $R^{24}$, $R^L$, and subscript a are as described above, $R^{27}$ is a divalent polyolefin (derived from telechelic silyl terminated polyolefin, described above), subscript XX>0, subscript YY≥0, and subscript ZZ>1.

In an alternative embodiment, a telechelic silyl terminated polyolefin may be used as starting material A) and a silsesquioxane may be used as starting material B). In this embodiment, the copolymer comprises unit formula (PR4):

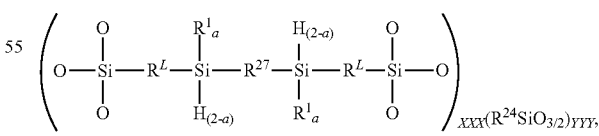

$_{XXX}(R^{24}SiO_{3/2})_{YYY}$, where $R^1$, $R^{24}$, $R^{27}$, $R^L$, and subscript a are as described above, and subscript XXX>0, subscript YYY≥0.

In an alternative embodiment, I) the polyolefin block is derived from a polyolefin having a pendant silyl group. In this embodiment, the polyolefin block may have unit formula

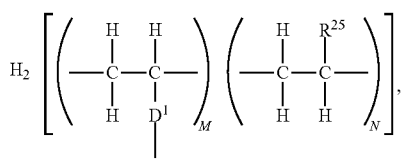

where each $R^{25}$ is independently selected from the group consisting of a hydrogen atom, a monovalent hydrocarbon group of 1 to 18 carbon atoms, and a monovalent halogenated hydrocarbon group of 1 to 18 carbon atoms as described above, each $D^1$ is independently a divalent hydrocarbon group as described above, and subscripts M and N have values such that m≥1 and n≥1. Alternatively, subscripts M and N may have values such that 1≤M≤10 and 10≤N≤20,000. In this embodiment, II) the polysiloxane resin block is as described above. In this embodiment, III) the linking group comprises a silicon atom and an oxygen atom, where the silicon atom in the linking group is bonded to $D^1$ in I) the polyolefin block and the oxygen atom in the linking group is bonded to a silicon atom in II) the polysiloxane resin block. The linking group has formula,

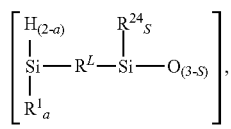

where subscript a, subscript S, $R^1$, $R^{24}$, and $R^L$ are as described above.

In the embodiment where starting material A) is a polyolefin having a pendant silyl group, and starting material B) is MQ resin, the copolymer comprises unit formula (PR5):

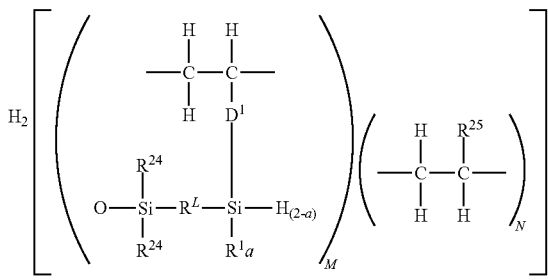

$_{XXXX}(R^{24}_3SiO_{1/2})_{YYYY}(SiO_{4/2})_{ZZZZ}$, where $R^1$, $R^{24}$, $R^L$, $D^1$, $R^{25}$ and subscripts a, M, and N are as described above, subscript XXXX>0, subscript YYYY≥0, and subscript ZZZZ>1.

In the embodiment where starting material A) is a polyolefin having a pendant silyl group, and starting material B) is silsesquioxane, the copolymer comprises unit formula (PR6):

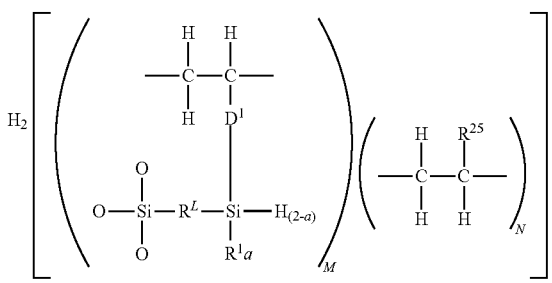

$_{XXXX}(R^{24}SiO_{3/2})_{YYYY}$, where $R^1$, $R^{24}$, $R^L$, $D^1$, $R^{25}$ and subscripts a, M, and N are as described above subscript XXXX>0, subscript YYYY≥0.

In each of the copolymers described above, in one embodiment the polyolefin block may be a polyethylene block or a poly(ethylene/octene) block. Alternatively, in each of the copolymer formulae (PR1), (PR2), (PR3), (PR4), (PR5), and (PR6), the copolymer may optionally further comprise units of formula $(R^{24}_2SiO_{2/2})$ when an MDQ resin is used as starting material B). In each of the copolymers described above when a Lewis Acid is used as starting material C), then $R^L$ is an oxygen atom. In each of the copolymers described above, when a hydrosilylation catalyst is used as starting material C), then $R^L$ is a divalent hydrocarbon group.

EXAMPLES

These examples are intended to illustrate the invention and should not be interpreted as limiting the scope of the invention set forth in the claims. Reference examples are not to be deemed to be prior art unless otherwise indicated.

Reference Example A—Procedure for Silylation of Di-polyethylene-zinc with Dimethylhydrogenchlorosilane (HMe₂SiCl)

Di-polyethylene-zinc and Isopar ($M_w$=1580 Da, 10 mM) were placed in a vial. The vial was heated at 120° C. until the contents became clear and homogeneous. HMe₂SiCl and NMI were added to the vial. The vial was heated at 90° C. for 3 hours. Iodine (I₂) was then added to quench unreacted di-polyethylene zinc. The resulting product was evaluated by ¹H NMR. The molar equivalents of HMe₂SiCl and converSiOn to product results are shown below.

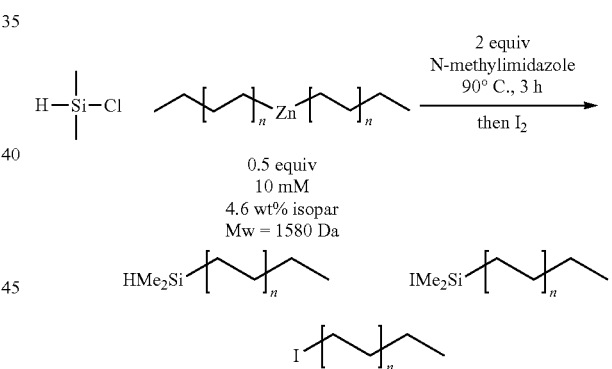

| Entry | Equiv. Si—Cl | Silyl-polymer:Iodo-polymer |
|-------|--------------|----------------------------|
| 1 | 2.0 | 75:25 |
| 2 | 8.0 | 90:10 |
| 3 | 10.0 | 90:10 |

Silyl:iodo ratio measured by ¹H NMR Integrations

Reference Example A showed that when a relatively volatile chlorosilane was used, improved silylation was achievable with extra equivalents of the chlorosilane.

Reference Example B—Procedure for Silylation of Di-polyethylene-zinc with Diphenylhydrogenchlorosilane (HPh₂SiCl)

Reference Example A was repeated, except that HPh₂SiCl was used instead of HMe₂SiCl. The results are shown below.

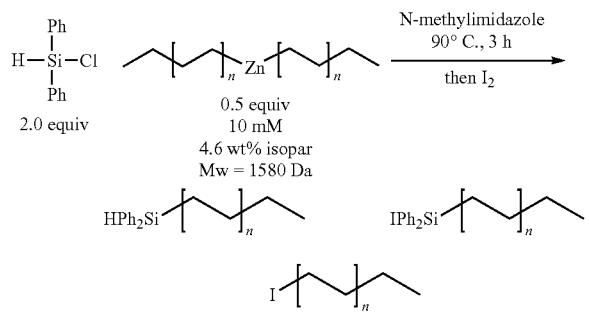

| Entry | Equiv. NMI | Silyl-polymer:Iodo-polymer |
|---|---|---|
| 1 | 2.0 | 80:20 |
| 2 | 0 | <5:95 |
| 3 | 1.0 | 20:80 |
| 4 | 0.1 | 5:95 |

Silyl:iodo ratio measured by $^1$H NMR Integrations

Reference Example B showed that complete silylation of the di-polyethylene-zinc was possible using NMI as an additive.

Reference Example C—Procedure for Silylation of Di-polyethylene-zinc with Phenyl,dihydrogen,chlorosilane (H$_2$PhSiCl)

Di-polyethylene-zinc and Isopar (Mw=1580 Da, 10 mM) were placed in a vial. The vial was heated at 120° C. until the contents became clear and homogeneous. H$_2$PhSiCl and an additive selected from NMI or blend of NMI with TMEDA were added to the vial. The vial was heated for a period of time. Iodine (I$_2$) was then added to quench unreacted di-polyethylene zinc. The resulting product was evaluated by $^1$H NMR. The molar equivalents of chlorosilane, of additive, the time and temperature for heating, and converSiOn to product results are shown below.

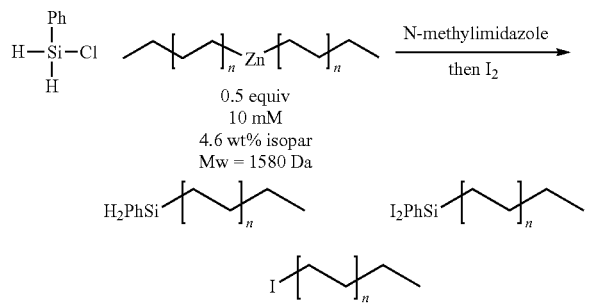

| Entry | Equiv. NMI | Equiv. Chlorosilane | temp. (° C.) | time (h) | Silyl-polymer:Iodo-polymer |
|---|---|---|---|---|---|
| 1 | 2.0 | 2.0 | 90 | 3 | >95:5 |
| 2 | 0.2 | 2.0 | 90 | 3 | 19:81 |
| 3 | 1.2 | 2.0 | 90 | 3 | >95:5 |
| 4 | 2.0 | 1.2 | 90 | 3 | >95:5 |
| 5 | 0.2 (0.55 equiv TMEDA) | 1.2 | 90 | 3 | 50:50 |
| 6 | 1.2 | 1.2 | 120 | 0.5 | >95:5 |

Silyl:iodo ratio measured by $^1$H NMR Integrations

Reference Example C showed that complete silylation with H$_2$PhSiCl was observed with the conditions described in Entry 6. At least 1 equivalent of N-methylimidazole was capable of completing the hydrosilylation. A blend of N-methylimidazole and another amine base was used as the additive for comparative purposes in Entry 5.

Reference Example D

Di-polyethylene-zinc and Isopar (Mw=1080 Da, 10 mM) were placed in a vial. The vial was heated at 120° C. until the contents became clear and homogeneous. Phenyl,dihydrogen,chlorosilane and an additive were added to the vial. The vial was heated at 100° C. for 1 hour. Iodine (I$_2$) was then added to quench unreacted di-polyethylene zinc. The resulting product was evaluated by $^1$H NMR. The additive and converSiOn to product results are shown below.

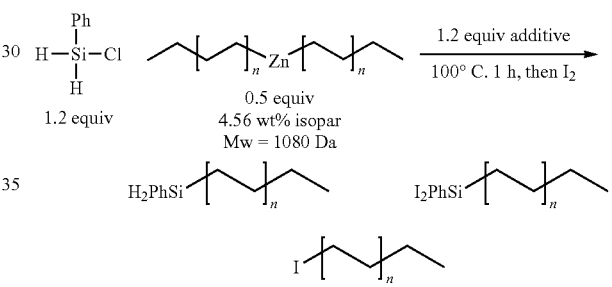

| Entry | Additive | Silyl-polymer:Iodo-polymer |
|---|---|---|
| 1 | TMAF | 51:49 |
| 2 | N-methyl-2-pyridone | 79:21 |
| 3 | DMPU | 89:11 |
| 4 | DMF | 53:47 |
| 5 | DMAP | >95:5 |
| 6 | Triethylamine | 36:64 |
| 7 | Pyridine N-oxide | >95:5 |
| 8 | none | 28:72 |

Silyl:iodo ratio measured by $^1$H NMR Integrations

Reference Example D showed that complete silylation was observed under the conditions tested using 4-dimethylaminopyridine, and pyridine-N-oxide as the additive. The example also showed that N-methyl pyridone and DMPU can also be used as the additive to promote silylation because as shown in Entry 2 and Entry 3, more silyl polymer formed than the comparative control (Entry 8) with no additive.

Reference Example E

Reference Example A was repeated using phenylhydrogendichlorosilane (HPhSiCl$_2$) instead of HMe$_2$SiCl and using 1.2 equivalents of NMI instead of 2 equivalents as the additive. The results are shown below.

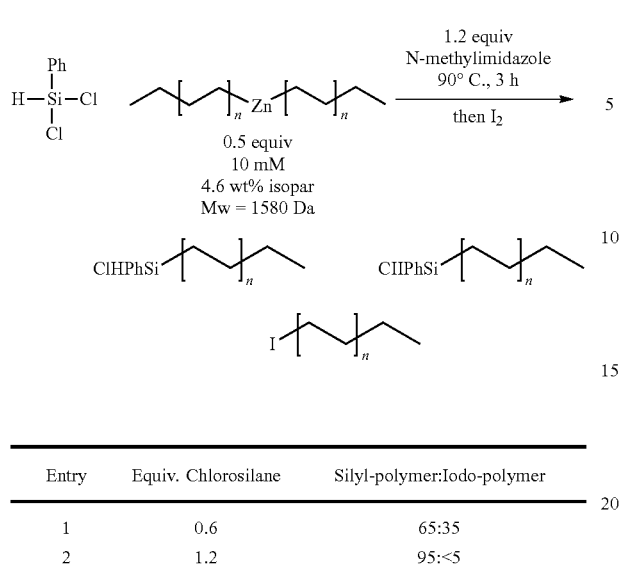

| Entry | Equiv. Chlorosilane | Silyl-polymer:Iodo-polymer |
|---|---|---|
| 1 | 0.6 | 65:35 |
| 2 | 1.2 | 95:<5 |

Silyl:iodo ratio measured by $^1$H NMR Integrations

Reference Example E showed that substitution occurred at only one of the two Si—Cl bonds, even when the amount of $HPhSiCl_2$ was reduced.

Reference Example F

Di-polyethylene-zinc and Isopar (Mw=1205 Da, 10 mM) were placed in a vial. The vial was heated at 120° C. until the contents became clear and homogeneous. Dimethylhydrogeniodosilane and NMI were added to the vial. The vial was heated at 110° C. for 3 hours. $I_2$ was then added to quench unreacted di-polyethylene zinc. The resulting product was evaluated by $^1$H NMR. The molar equivalents of $HMe_2SiI$ and converSiOn to product results are shown below.

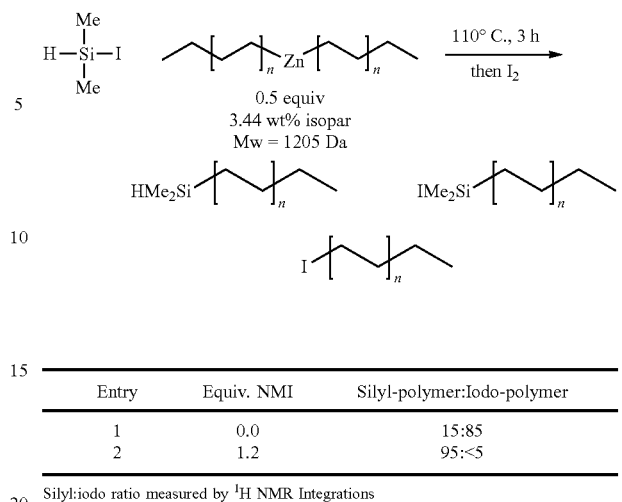

| Entry | Equiv. NMI | Silyl-polymer:Iodo-polymer |
|---|---|---|
| 1 | 0.0 | 15:85 |
| 2 | 1.2 | 95:<5 |

Silyl:iodo ratio measured by $^1$H NMR Integrations

Reference Example F showed that NMI also promoted silylation with halosilanes other than chlorosilanes (e.g., iodosilanes). In the absence of NMI, the iodosilane was not electrophilic enough to undergo complete reaction with the dipolyethylene-zinc under the conditions tested in this example.

Reference Example G

Silylation of an ethylene/octene polymeryl zinc with $H_2PhSiCl$ was performed as follows. In a glovebox, a 20 mL vial was charged with the copolymerylzinc (Mn=1940 Da, 30.66% octene, 3.10% polymer in Isopar™ E, 14.95 g, 0.117 mmol, 0.500 equiv). The mixture was stirred and heated to 110° C. until the mixture became clear and homogeneous. NMI (22.5 µL, 0.282 mmol, 1.20 equiv) was added, followed by chlorophenylsilane (37.6 µL, 0.282 mmol, 1.20 equiv). The mixture was stirred for 1 hour. A portion of the solution was removed and quenched with an excess of iodine for converSiOn analysis. The polymer solution was poured into an excess of methanol, which precipitated the polymer. The polymer was isolated by filtration and was dried in a vacuum oven.

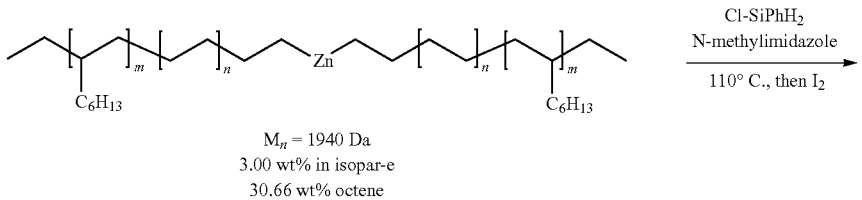

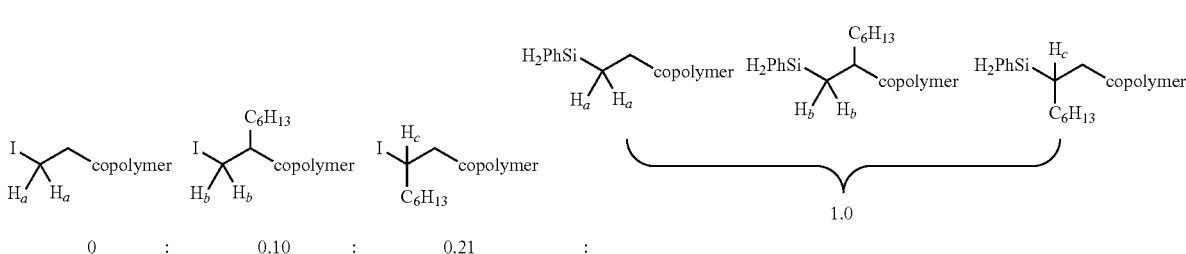

Iodine quench in absence of silylation

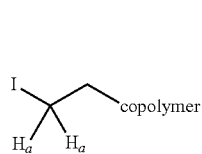 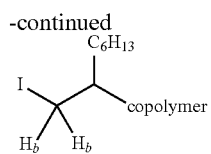 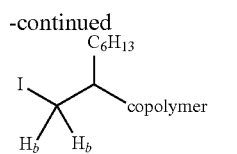

1 : 0.19 : 0.18

Reference Example G showed that silylation with an ethylene/octene copolymeryl-zinc is possible using NMI.

Reference Example H—General Procedure for Preparation of Silyl Terminated Organo-Metal Polymerizations were conducted in a 2 L PARR batch reactor. The reactor was heated by an electrical heating mantle and was cooled by an internal serpentine cooling coil containing cooling water. Both the reactor and the heating/cooling system were controlled and monitored by a CAMILE TG process computer. The bottom of the reactor was fitted with a dump valve, which emptied the reactor contents into a stainless steel dump pot. The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene, Isopar™ E, and toluene were passed through two columns, the first containing A2 alumina, the second containing Q5. The ethylene was passed through 2 columns, the first containing A204 alumina and 4 Å mol sieves, the second containing Q5 reactant. The nitrogen, used for transfers, was passed through a single column containing A204 alumina, 4 Å mol sieves and Q5.

The desired amount of Isopar™ E and/or toluene solvent and/or 1-octene was added via shot tank to the load column, depending on desired reactor load. The load column was filled to the load set points by use of a lab scale to which the load column was mounted. After liquid feed addition, the reactor was heated up to the polymerization temperature set point. If ethylene was used, it was added to the reactor when at reaction temperature to maintain reaction pressure set point. Ethylene addition amounts were monitored by a micro-motion flow meter.

The scavenger, MMAO-3A (which is commercially available from Akzo Nobel), was handled in an inert glove box, drawn into a syringe and pressure transferred into the catalyst shot tank. This was followed by 3 rinses of toluene, 5 mL each, before being injected into the reactor. The chain-shuttling agent was handled in an inert glove box, drawn into a syringe and pressure transferred into the catalyst shot tank. This was followed by 3 rinses of toluene, 5 mL each, before being injected into the reactor. The procatalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition, the run timer began. If ethylene was used, it was then added by the CAMILE to maintain reaction pressure set point in the reactor. These polymerizations were either run for 10 minutes, or a targeted ethylene uptake. The agitator was then stopped and the bottom dump valve opened to empty reactor contents into a clean dump pot that had been stored in a 130° C. oven for greater than 60 minutes before use to drive off any excess water absorbed by the metal surface. Once the contents of the reactor were emptied into the dump pot, the normal flow of nitrogen inerting was switched to argon, via a ball valve. The argon flowed for a calculated period of time to allow five exchanges of the volume of gas in the pot. When the argon inerting was complete, the dump pot was lowered from its fixture, and a secondary lid with inlet and outlet valves was sealed to the top of the pot. The pot was then inserted with argon for an additional five exchanges of gas, via a supply line and inlet/outlet valves. When complete, the valves were closed. The pot was then transferred to a glove box without the contents coming into contact with the outside atmosphere.

Reference Example I—Preparation of Sample According to General Procedure of Reference Example H A sample was prepared following the general procedure in Reference Example H using the following conditions: 120° C., 23 g of initial ethylene loaded, 600 g toluene, 10 μmol MMAO-3A, 1.2 eq. of activator to procatalyst. The amount of procatalyst used was adjusted to reach a desired efficiency. The reactor pressure and temperature were kept constant by feeding ethylene during the polymerization and cooling the reactor as needed. The polymerization was performed with bis(hydrogenated tallow alkyl)methylammonium tetrakis(pentafluorophenyl)borate as the activator, bis(N-isobutyl-6-mesitylpyridin-2-amine)dimethylhafnium as the procatalyst, and bis(8-(dimethylsilyl)octyl)zinc as the chain shuttling agent.

Reference Example J—Water Washing

This Reference Example J shows a water washing method used to purify mono-SiH terminated polyethylene. 0.90 g of mono-SiH polyethylene prepared as described above was diluted to 10% in toluene in a 100 mL round bottom flask containing a magnetic stir bar. The solution was heated by placing the flask in an aluminum block at a temperature of 85° C. The mono-SiH terminated polyethylene dissolved. Deionized water (6 g) was added and mixed for 5 minutes. Stirring was then stopped, and the aqueous phase (on bottom) was removed using a plastic pipette. Excellent separation was achieved. Both phases were clear, and the pH of the wash water was alkaline.

The following process was performed 7 times at 85° C. Deionized water (4 g) was added and mixed for 5 minutes. The aqueous phase was removed. The resulting solution of toluene and mono-SiH terminated polyolefin was poured onto a Teflon™ sheet to dry overnight. The pH of the final water wash was slightly acidic, indicating that the imidazole was successfully removed.

The silyl terminated polyolefins prepared as described in the Reference Examples above can be used as starting materials to make polysiloxane resin-polyolefin copolymers.

In this Example 1, a polyethylene (PE) modified Me-T resin, 36 wt % PE was prepared. The following starting materials were used to make a polymethylsilsesquioxane-polyethyelene copolymer. Starting material B1) was a methylsilsesquioxane (Methyl-T) Resin with FW=79.1 g/mol Si; OZ=55.80 mol %; and 48.55 mol % methoxy groups. Starting material A1) was the mono-SiH terminated polyethylene (850 g/mol) prepared according to Reference Example F and water washed as described in Reference Example J, above. Starting material D1) was toluene, Fisher Scientific ACS grade. Starting material C1) was tris(pentafluorophenyl)borane, provided 5% in toluene (also known as BCF catalyst).

A reactor was loaded with 2.5 weight parts of B1) Methyl-T Resin, 1.4 weight parts of A1) mono-SiH terminated polyethylene, and 11.7 weight parts D1) toluene. The amount of mono-SiH terminated polyethylene added would equate to a resin structure of $M^{PE}_{0.05}T^{Me}_{0.95}$ where in this case the $M^{PE}$ unit is polyethylene. The reactor was heated to 85° C. The solution in the reactor was clear at this temperature. Starting material C1) BCF catalyst in an amount of 0.019 weight parts was added, equating to 250 ppm BCF based on solids (resin+polyethylene). Gas formation was evident within 2 minutes after addition. The reactor was heated at 85° C. Samples were analyzed after 30 minutes and 2 hours. A fair amount of SiH was left after 2 hours. There was no noticable decrease in SiH content between 30 minutes and 2 hours. Additional C1) BCF catalyst (0.019 weight parts) was added to equate to a new concentration 500 ppm in the reactor. Gas formation was evident within 1 minute of addition. Heating the reactor continued at 85° C. Samples were analyzed by IR after 30 minutes, and this showed no SiH remained. The reactor was left over the weekend at room temperature.

To hydrolyze the remaining methoxy (OMe) groups, 0.55 weight parts of deionized water (in a stoichiometric amount of 2 mols water:1 mol OMe) at 85° C. followed by 0.02 weight parts of 10% HCl in water, which equated to 0.05% based on solids. The resulting mixture was heated at 85° C. for 2 hours. No gellation was observed. Thereafter, water (5 volume parts) was added and mixed. Mixing was then stopped, and some volatiles were then distilled off. D1) toluene (5 weight parts) was then added, and the reactor contents were allowed to phase separate. The top phase was the organic phase, which was removed and dried.

In this example 2, a PE modified Ph-T resin, 36 wt % PE was prepared. The following starting materials were used to make a polymethylsilsesquioxane-polyethyelene copolymer. Starting material B2) was a phenyl silsesquioxane resin with 5% hydroxyl groups. Starting material A1) was the mono-SiH terminated polyethylene (850 g/mol) described above. Starting material D1) toluene, Fisher Scientific ACS grade was also used in this Example 2. Starting material C1) BCF catalyst was also used in this Example 2.

A reactor was loaded with 2.5 weight parts starting material B2), 1.4 weight parts starting material A1), 11.6 weight parts of D1) toluene, plus an amount sufficient to the volume of the apparatus to provide a nonvolatile content of 25% in the reactor. The reactor was stirred and the contents heated to reflux for 15 minutes to remove any water. The reactor was cooled to 85° C., and the solution in the reactor was clear. Starting material C1) BCF catalyst in an amount of 0.019 weight parts (an amount sufficient to provide 247 ppm BCF based on solids, B2) and A1) in the reactor). Gas formation was evident within 1 minute after addition as observed by foaming. The reactor contents were heated at 85° C. for 1.5 hours. A sample analyzed at 1 hour by IR did not show any detectable SiH. The reactor contents were then dried.

In this example 3, a PE modified MQ resin, 36 wt % PE was prepared. The following starting materials were used to make a polymethylsilsesquioxane-polyethyelene copolymer. Starting material B3) was a polymethylsilicate resin with FW=70.45 g/mol Si; and 13.18 mol % OH. Starting material A1) was the mono-SiH terminated polyethylene (850 g/mol) described above. Starting material D1) toluene, Fisher Scientific ACS grade was also used in this Example 3. Starting material C1) BCF catalyst was also used in this Example 3.

A reactor was loaded with the following starting materials: B3) in an amount of 2.5 weight parts, A1) mono-SiH terminated polyethylene in an amount of 1.35 weight parts, D1) toluene in an amount of 11.55 weight parts plus an amount sufficient to the volume of the apparatus to provide a nonvolatile content of 25% in the reactor. The reactor was heated to reflux for 15 minutes to remove any water. The reactor was cooled to 85° C., and the solution therein was clear. Starting material C1) BCF catalyst in an amount of 0.0169 weight parts (which equated to 219 ppm BCF based on solids (resin+PE)) was added to the reactor. The reactor contents foamed (gas formation) almost immediately. The reactor was heated at 85° C. for 2.5 hours. Samples were taken periodically for analysis for SiH by IR. There was still some SiH left after 2.5 hours. Additional C1) BCF catalyst was added in an amount of 0.0196 weight parts, which equated to 255 ppm BCF based on solids (resin+PE) making for a total of 474 ppm added. No foaming was observed this time.

The below table summarizes the crystallization data acquired by DSC on the original SiH PE and the modified Si Resins. The crystallization temperature reduction again shows the dramatic impact the Si resin environment has on the crystallization behavior of the PE. This is an indication for the high disperSiOn efficiency within the siloxane.

| Sample | Description | Tcryst, ° C. | Tcryst reduction, ° C. | $\Delta H_C$, J/g | Theo % PE |
| --- | --- | --- | --- | --- | --- |
| Starting material A1) used in the examples | Mono SiH PE, Mn 850 g/mol | 96.2 | | 214.1 | |
| Example 1 | PE - $T^{Me}$ | 85.2 | 11.0 | 50.3 | 23% |
| Example 3 | PE - MQ | 81.7 | 14.5 | 41.4 | 19% |
| Example 2 | PE - $T^{Ph}$ | 65.9 | 30.3 | 36.0 | 17% |

The polysiloxane resin-polyolefin copolymer samples were exposed to 300° C. for 30 minutes in an inert He environment Visual appearance of the samples also confirmed the high disperSiOn quality with all samples exhibiting optical clarity at 150° C., above the melting point of PE and even slightly cloudy or clear at room temperature:

| Sample | Description | Film at 150° C. | Upon cooling to 23° C. | After heating to 300° C. and cool to 23° C. |
| --- | --- | --- | --- | --- |
| Example 1 | PE - $T^{Me}$ | Clear | Slightly cloudy | Very slightly cloudy |
| Example 3 | PE - MQ | Clear | Cloudy | Very slightly cloudy |
| Example 2 | PE - $T^{Ph}$ | Clear | Very slightly cloudy | Clear |

In this example 4, a PE modified MQ resin having 35 wt % PE was prepared. Starting material B4) was a vinyl functional MQ resin of unit formula $M_{0.432}M^{Vi}_{0.061}D_{0.060}Q_{0.501}$ (where M refers to a trimethylsiloxy unit ($Me_3SiO_{1/2}$), $M^{Vi}$ refers to a dimethylvinylsiloxy unit ($Me_2ViSiO_{1/2}$), D refers to a dimethylsiloxy unit ($Me_2SiO_{2/2}$), and Q refers to a tetrasiloxy unit ($SiO_{4/2}$), where the subscripts represent mole fractions of each unit present, Me represents a methyl group, Vi represents a vinyl group, and the vinyl functional MQ resin had FW=71.62 g/mol Si and was delivered at 78.19 wt % in xylenes. Starting material A2) was a mono-SiH terminated polyethylene having NMR Mn=963, Effective NMR Mn=983, GPC Mn=757, and PDI=1.22. Starting material D2) was Xylenes, ACS grade from Fisher Scientific. Starting material C2) was a solution containing 24.62 wt % of a platinum vinylsiloxane complex containing dissolved in xylenes.

A 250 mL round bottom flask was loaded with: 7 g of starting material A2), 13 g of starting material B4) delivered in xylene (in mixture totaling 16.63 g), 56.37 g xylenes+an additional amount equal to the volume of the Dean Stark apparatus. A magnetic stir bar was used for mixing, and a heated aluminum block was used to heat the mixture. The mixture was heated at reflux for 15 minutes to remove any water that might be present. The Dean Stark apparatus was used for this.

The resulting mixture was cooled to a couple of degrees below reflux, and then starting material C2) a Pt catalyst in a solution (0.51 g of solution containing 390 ppm Pt) was added. This amounted to 10 ppm Pt based on solids.

The resulting mixture was heated at reflux for 21 hours (overnight). Reaction was verified complete by IR analysis for SiH. Reaction was likely done in less time. The resulting product was stripped to dryness using a rotary evaporator at an oil bath temperature of 120° C. and 1-2 mm Hg. The product was a viscous liquid with a light haze at this temperature.

The product was poured into an aluminum dish and heated in a 150° C. oven. The resulting product was an opaque brittle solid at room temperature and a viscous liquid (with light haze) at 120° C. Yield was 19.55 g.

In this example 5, a hydrosilylation coupled, PE modified Phenyl-T resin with 35 wt % PE was prepared. The starting materials used were as follows: starting material B5) was a vinyl functional MT resin, $M^{Vinyl}T^{Ph}$ Resin dissolved 60.26% in toluene. Starting material A2) was as described above in example 4. Starting material D3) was toluene from Fisher Scientific, ACS grade. Starting material C3) was a solution containing 24.64 wt % of a platinum vinyl siloxane complex dissolved in toluene.

A 250 mL round bottom flask was loaded with: 7.0 g of starting material A2), 21.57 g of starting material B5), and 51.43 g starting material D3) plus an additional amount equal to the volume of the Dean Stark apparatus. A magnetic stir bar was used for mixing, and a heated aluminum block was used to heat the reaction. The mixture was heated at reflux for 15 minutes to remove any water that might be present using the Dean Stark apparatus. The resulting mixture was then cooled a couple of degrees below reflux, and then 0.60 g of starting material C2) was added, thereby providing ~10 ppm Pt based on solids.

The resulting mixture was heated at reflux for 19.5 hours (overnight). IR analysis for SiH showed reaction was complete. The resulting product was stripped to dryness using a rotary evaporator at an oil bath temperature of 120° C. and 1-2 mm Hg. The resulting product was a low viscosity very hazy liquid at this temperature. The product was poured into an aluminum dish in a 150° C. oven. The resulting product was a translucent brittle solid at room temperature and a hazy low viscosity liquid at 120° C. Yield was 19.98 g.

In this example 6, a hydrosilylation coupled, PE modified Phenyl-T resin containing 20 wt % PE was prepared with a telechelic SiH ended PE. A 100 mL round bottom flask was loaded with 2.4 g of starting material A3) a telechelic SiH polyethylene (NMR Mn=1307, Effective NMR Mn=1623) with 18.5% dead chain ends, and 37% mono-functional chains; 15.93 g of starting material B5) as described above in example 5, 29.67 g of starting material D3) described above in example 5 and additional starting material D3) in an amount equal to the volume of a Dean Stark apparatus. A magnetic stir bar was used for mixing, and a heated aluminum block was used to heat the reaction. The mixture was heated at reflux for 15 minutes to remove any water that might be present using the Dean Stark apparatus.

The resulting mixture was then cooled to a couple of degrees below reflux, and then 0.6 g of starting material C3) described above in example 5 was added, thereby providing 10 ppm Pt based on solids. The resulting mixture was heated at reflux for 24 hours (overnight). IR analysis for SiH showed reaction was complete. It was likely done in less than 24 hours, but more than 8 hours. SiH content was monitored using IR with a 0.1 mm path length liquid cell.

The resulting product was stripped to dryness using a rotary evaporator at an oil bath temperature of 120° C. and 1-2 mm Hg. The stripped product was a hazy viscous liquid at 120° C. This product was poured into an aluminum dish in a 150° C. oven. The resulting product was a translucent brittle solid at room temperature. Yield was 11.94 g.

In this example 7, a Hydrosilylation coupled, PE modified MQ resin with 20 wt % PE was prepared from a telechelic SiH ended PE. The reagents used were starting materials B4), A3), D2) and C2) as described above were used. A 100 mL round bottom flask was loaded with 2.4 g starting material A3), 12.28 g starting material B4), 33.32 g starting material D2) (plus an additional amount equal to the volume of the Dean Stark apparatus). A magnetic stir bar was used for mixing and a heated aluminum block was used to heat the resulting mixture. The mixture was heated at reflux for 15 minutes to remove any water that might be present using the Dean Stark apparatus was used for this. The mixture was then cooled to a couple of degrees below reflux. Starting material C2 (0.36 g) was then added, which amount to 10 ppm Pt based on solids. The resulting reaction mixture was heated at reflux for 6.5 hours. The reaction was verified complete as analyzed by IR for SiH. The resulting product was stripped to dryness using a rotary evaporator at an oil bath temperature of 120° C. and 1-2 mm Hg. The product was a solid at 120° C.

The visual appearance of the samples confirmed varying levels of disperSiOn quality of the PE into the siloxane resin matrix. Even when samples were cloudy, the uniformity of this cloudiness confirmed a high level of disperSiOn.

Appearance Observations:

| Sample | Description | Appearance at RT | Appearance at 120° C. |
|---|---|---|---|
| Example 4 | PE (35%) - MQ | Cloudy solid | Slightly Hazy liquid |
| Example 5 | PE (35%) - $T^{Ph}$ | Translucent solid | Hazy liquid |
| Example 6 | $T^{Ph}$ - PE (20%) - $T^{Ph}$ | Translucent solid | Hazy liquid |
| Example 7 | MQ - PE (20%) - MQ | Cloudy solid | Slightly cloudy solid |

FIG. 1 shows pictures of some of the samples prepared as described above in the melt (at 120° C.) and at 30° C. (taken at the start and end of a rheology experiment, pictures show the 1 mm thick sample sandwiched between 25 mm parallel plates).

Differential scanning calorimetry was used to assess the level of incorporation of PE and how much the siloxane matrix affected its crystallization upon cooling from the melt. All samples exhibited a 8° C. to 37° C. reduction in the crystallization temperature further confirming a highly dispersed PE in the siloxane matrix. The results are shown in the table below.

Thermal Analysis Testing:

| Sample | Description | Tcryst, ° C. | Tcryst reduction, ° C. | $\Delta H_C$ J/g | Theo % PE |
|---|---|---|---|---|---|
| Control, no siloxane, (This was starting material A2) used in the examples above.) | Mono SiH PE, Mn 963 g/mol | 100 | Not applicable | 215.6 | Not applicable |
| Example 4 | PE (35%) - MQ | 87.2 | 12.8 | 56.3 | 26% |
| Example 5 | PE (35%) - $T^{Ph}$ | 90.6 | 9.4 | 71.4 | 33% |
| Example 6 | $T^{Ph}$ - PE (20%) - $T^{Ph}$ | 91.6 | 8.4 | 38.8 | 18% |
| Example 7 | MQ - PE (20%) - MQ | 63.3 | 36.7 | 18.1 | 8.4% |

Rheological evaluations were conducted to determine viability of these hybrid system in industrial applications. In accordance with trends around solvent-free products and high manufacturing throughput, delivering a product as a flowable melt could be advantageous. The rheology results below showed that the polysiloxane resin-polyolefin copolymers described herein were flowable liquids at manageable temperatures (e.g. 5.5 Pa·s at 120° C. for example 4). They quickly solidified upon passing the crystallization temperature (around 100° C.) so that solid, high hardness films can be prepared at 30° C. or less.

Rheology Evaluations:

| Sample | Description | Coupling | η* (120° C.), Pa · s | $T_{cryst}$, ° C. (G' onset) | G' at 30° C., kPa |
|---|---|---|---|---|---|
| Example 2 | PE (36%) - $T^{Me}$ | PR | 22.8 | 98.6 | 54 |
| Example 3 | PE (36%) - $T^{Ph}$ | PR | 0.9 | 97.3 | 2,300 |
| Example 4 | PE (35%) - MQ | Pt | 5.5 | 98.0 | 42,800 |
| Example 5 | PE (35%) - $T^{Ph}$ | Pt | 0.9 | 97.5 | 21,200 |
| Example 6 | $T^{Ph}$ - PE (20%) - $T^{Ph}$ | Pt | 12.2 | 98.0 | 35,200 |

In this example 8, a hydrosilylation coupled, PE modified DT resin containing 35 wt % PE was prepared from a mono SiH PE, 249 Flake, and 1160Mn Polyethylene. The following starting materials were used:

Starting material B6) was a DT resin (DOWSIL™249 flake from Dow Silicones Corporation of Midland, Mich. USA) having formula $D_{0.152} T^{Me}_{0.384} T^{Ph}_{0.464}$; 41.8 mol % OZ and FW=100.8 g/mol Si. Starting material A4) was mono-SiH terminated polyethylene (NMR Mn=1160, Effective NMR Mn=1208, GPC Mn=870, PDI=1.24). Starting material D3) was toluene-Fisher Scientific ACS grade, and starting material C4) was tris(pentafluorophenyl)borane-4.9 wt % in toluene; Mw=511.98.

A 100 mL round bottom flask was loaded with 3.5 g of starting material B6), 3.5 g starting material A4), and starting material D3) in an amount of 30 g plus an additional amount equal to the volume of a Dean Stark apparatus. A magnetic stir bar was used for mixing. The resulting mixture was heated to reflux to remove any water that may have been present. The resulting mixture was refluxed for 15 minutes. The resulting mixture had a light haze.

This mixture was cooled; the flask was placed in an aluminum block at temperature of 100° C. (and internal temperature of the flask was 91° C.). Starting material C) was added. Reaction was complete within 25 minutes. Gas formation was evident within 1 minute after addition an amount sufficient to provide of 370 ppm tris(pentafluorophenyl)borane as observed by foaming.

The resulting product was poured into an aluminum pan to dry overnight. The product was dried using a rotary evaporator under vacuum of 2 mmHg with oil bath temperature of 120° C. for 30 minutes. The resulting product was a hazy viscous liquid at this temperature, and a brittle solid at room temperature.

Visual appearance of the samples confirmed varying levels of disperSiOn quality of the PE into the siloxane resin matrix. Even when samples were cloudy, the uniformity of this cloudiness confirmed a high level of disperSiOn.

Appearance Observations:

| Sample | Description | Appearance at RT | Appearance at 120° C. |
|---|---|---|---|
| Example 8 | PE (35%) - $DT^{Ph}$ | Cloudy solid | Slightly Hazy liquid |

Differential scanning calorimetry was used to assess the level of incorporation of PE and how much the siloxane matrix affects its crystallization upon cooling from the melt. The PE modified DT resin sample exhibits a 11° C. reduction in the crystallization temperature further confirming a highly dispersed PE in the siloxane matrix.

Thermal Analysis Testing:

| Sample | Description | Tcryst, ° C. | Tcryst reduction, ° C. | $\cdot H_C$, J/g | Theo % PE |
|---|---|---|---|---|---|
| Control, This was starting material A4) | Mono SiH PE, Mn 1160 g/mol | 104.5 | not applicable | 215.1 | not applicable |
| Example 8 | PE (35%) - $DT^{Ph}$ | 93.4 | 11.1 | 74.58 | 34.6% |

The rheology results below showed that the PE modified DT resin was a flowable liquid at manageable temperatures that quickly solidified upon passing the crystallization temperature (around 100° C.) so that solid, high hardness films can be prepared at room temperature.

Rheology Evaluations:

| Sample | Description | η* (120° C.), Pa · s | $T_{cryst}$, ° C. (G' onset) | G' at 30° C., kPa |
|---|---|---|---|---|
| Example 8 | PE (35%) - $DT^{Ph}$ | 3.1 | 102.8 | 46,000 |

INDUSTRIAL APPLICABILITY

Polyolefins have performance characteristics that complement those of polyorganosiloxane resins making for a true synergistic hybrid. Silsesquioxane (T) Resins are typically functionalized with methyl or phenyl groups for high thermal stability and "organic like" solubility parameters. These resins are extremely brittle as pure materials. Polyorganosilicate (MQ) resins are typically used as rheology modifiers for polydimethylsiloxanes but can be considered to be nano-silica reinforcing particles. The hybrid copolymers may offer the benefits of the polyorganosiloxane resins with less brittle character.

Definitions and Usage of Terms

The Brief Summary of the Invention and the Abstract are hereby incorporated by reference. All amounts, ratios, and percentages are by weight unless otherwise indicated. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, and an aryl group includes the member alkyl individually; the subgroup alkyl and aryl; and any other individual member and subgroup subsumed therein.

"Alkyl" refers to a cyclic or linear, branched or unbranched, saturated monovalent hydrocarbon group. Alkyl is exemplified by, but not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl; and hexyl, heptyl, octyl, nonyl, and decyl, as well as other cyclic or branched saturated monovalent hydrocarbon groups with 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Alkenyl" means a branched, or unbranched unsaturated monovalent hydrocarbon group, where the monovalent hydrocarbon group has a double bond. Alkenyl groups include vinyl, ethenyl, allyl, and hexenyl, and branched isomers thereof. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched unsaturated monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom, and may optionally have pendant hydrocarbon groups. Aryl is exemplified by, but not limited to, phenyl, naphthyl, benzyl, tolyl, xylyl, phenylethyl, phenyl propyl, and phenyl butyl. Aryl groups have at least 5 carbon atoms. Monocyclic aryl groups may have 5 to 12 carbon atoms, alternatively 6 to 9 carbon atoms, and alternatively 6 to 8 carbon atoms. Polycyclic aryl groups may have 7 to 17 carbon atoms, alternatively 7 to 14 carbon atoms, and alternatively 9 to 12 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene, cyclohexene or norbornadiene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Halogenated hydrocarbon" means a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl 2,2-dichlorocyclopropyl, 2,3-dichlorocyclopentyl. Haloalkenyl groups include chloroallyl.

Abbreviations used herein are as defined in Table A.

TABLE A

| Abbreviation | Meaning |
| --- | --- |
| bp | Boiling point |
| DP | Degree of polymerization |
| DSC | Differential scanning calorimetry |
| Et | ethyl |
| FW | Formula weight |
| GPC | Gel permeation chromatography |
| IR | Infra-red |
| Pa · s | Pascal seconds |
| Me | methyl |
| mg | milligram |
| Mn | Number average molecular weight |
| Mw | Weight average molecular weight |
| NMR | Nuclear magnetic resonance |
| NVC | Nonvolatile content |
| ODMS | octenyldimethylsilane |
| OZ | OH group, alkoxy group such as methoxy, or both groups |
| PDMS | Polydimethylsiloxane |

TABLE A-continued

Abbreviations

| Abbreviation | Meaning |
|---|---|
| Tg | Glass transition temperature calculated from the half extrapolated tangents method |
| Tm | Melting temperature |
| uL | microliter |

The invention claimed is:

1. A method for preparing a polysiloxane resin-polyolefin copolymer comprising:
1) combining starting materials comprising:
A) a polyolefin having a silicon bonded hydrogen functional group of formula

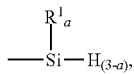

where each $R^1$ is an independently selected monovalent hydrocarbon group and subscript a is 1 or 2;
B) a polysiloxane resin having, per molecule, at least one silicon bonded group reactive with silicon bonded hydrogen of starting material A); and
C) a catalyst.

2. The method of claim 1, where starting material A) is a silyl terminated polyolefin with unit formula:

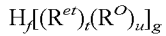

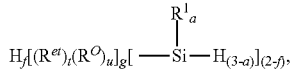

where subscript a and $R^1$ are as described above, subscript f is 0 to 1, subscripts t and u have relative values such that $0<t\leq 1$, $0\leq u\leq 1$, subscript g is 1 or more, each $R^{et}$ represents an ethylene unit, and each $R^O$ represents an olefin unit, other than ethylene.

3. The method of claim 1, where starting material A) is a polyolefin with a pendant silyl group comprising unit formula:

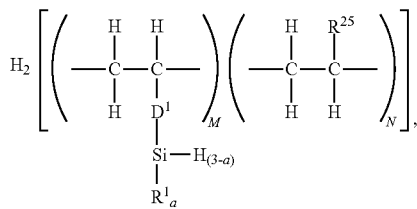

where $R^1$ and subscript a are as described above; each $R^{25}$ is independently selected from the group consisting of a hydrogen atom, a monovalent hydrocarbon group of 1 to 18 carbon atoms, and a monovalent halogenated hydrocarbon group of 1 to 18 carbon atoms, each $D^1$ is independently a divalent hydrocarbon group, and subscripts M and N have values such that $M\geq 1$ and $N\geq 1$.

4. The method of claim 1, where starting material B) comprises unit formula B-1):
$(R^{24}_3SiO_{1/2})_A(R^{24}_2SiO_{2/2})_B(R^{24}SiO_{3/2})_C(SiO_{4/2})_D$, where subscripts A, B, C, and D have values such that $0\leq A\leq 0.6$, $0\leq B\leq 0.5$, $0\leq C\leq 1$, $0\leq D\leq 1$, with the provisos that a quantity $(C+D)>0$ and when $D>0$ then $A>0$; and each $R^{24}$ is independently a monovalent hydrocarbon group of 1 to 30 carbon atoms or a hydrolyzable group, with the proviso that the at least one $R^{24}$ per molecule is a hydrolyzable group or an aliphatically unsaturated hydrocarbon group.

5. The method of claim 1, where starting material B) comprises B-2) a polyorganosilicate comprising unit formula $(R^{24}_3SiO_{1/2})_c(R^{24}_2SiO_{2/2})_d(SiO_{4/2})_e$, where subscripts c, d, and e have values such that $0<c<0.6$, $0\leq d<0.5$, $0.4<e<1$; each $R^{24}$ is independently selected from the group consisting of a monovalent hydrocarbon group of 1 to 30 carbon atoms or a hydrolyzable group, with the proviso that at least one $R^{24}$ per molecule is a hydrolyzable group, and starting material C) comprises a Lewis Acid catalyst.

6. The method of claim 1, where starting material B) comprises B-3) a silsesquioxane resin of unit formula $(R^{24}_3SiO_{1/2})_f(R^{24}_2SiO_{2/2})_g(R^{24}SiO_{3/2})_h(SiO_{4/2})_i$, where subscripts f, g, h, and i have values such that $0\leq f<0.5$, $0\leq g<0.5$, $0.5<h\leq 1$, $0\leq i<0.2$, and each $R^{24}$ is independently selected from the group consisting of a hydrocarbon group of 1 to 30 carbon atoms and a hydrolyzable group, with the proviso that at least one $R^{24}$ per molecule is a hydrolyzable group, and starting material C) comprises a Lewis Acid catalyst.

7. The method of claim 1, where starting material C) is selected from the group consisting of: $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; and $(C_6F_5)_2B$—$CH_2CH_2Si(CH_3)$.

8. The method of claim 7, where starting material C) comprises $B(C_6F_5)_3$.

9. The method of claim 1, where starting material B) comprises B-3) a polyorganosilicate comprising unit formula $(R^{24}_3SiO_{1/2})_c(R^{24}_2SiO_{2/2})_d(SiO_{4/2})_e$, where subscripts c, d, and e have values such that $0<c<0.6$, $0\leq d<0.5$, $0.4<e<1$; each $R^{24}$ is independently selected from the group consisting of a monovalent hydrocarbon group of 1 to 30 carbon atoms or a monovalent hydrocarbon group having terminal aliphatic unsaturation, with the proviso that at least one $R^{24}$ per molecule is a monovalent hydrocarbon group having terminal aliphatic unsaturation, and starting material C) comprises a hydrosilylation catalyst.

10. The method of claim 9, where the monovalent hydrocarbon group having terminal aliphatic unsaturation is an alkenyl group selected from the group consisting of vinyl, allyl, and hexenyl.

11. The method of claim 1 where starting material B) comprises B-4) a silsesquioxane resin of unit formula $(R^{24}_3SiO_{1/2})_f(R^{24}_2SiO_{2/2})_g(R^{24}SiO_{3/2})_h(SiO_{4/2})_i$, where subscripts f, g, h, and i have values such that $0\leq f<0.5$, $0\leq g<0.5$, $0.5<h\leq 1$, $0\leq i<0.2$, and each $R^{24}$ is independently selected from the group consisting of a hydrocarbon group of 1 to 30 carbon atoms and monovalent hydrocarbon group having aliphatic unsaturation, with the proviso that at least one $R^{24}$ per molecule is a monovalent hydrocarbon group having terminal aliphatic unsaturation, and starting material C) comprises a hydrosilylation catalyst.

12. The method of claim 1, where the starting materials further comprise one or more additional starting materials selected from the group consisting of D) a solvent, E) a stabilizer, or both D) and E).

13. A polysiloxane resin-polyolefin copolymer comprising:

I) a polyolefin block,

II) a polysiloxane resin block, and

III) a divalent linking group comprising a first silicon atom and a first oxygen atom, where the first silicon atom in the linking group is bonded to a carbon atom in the polyolefin block and the first oxygen atom in the linking group is bonded to a silicon atom in the polysiloxane resin block, the linking group has formula

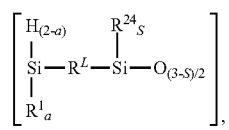

where subscript a is 1 or 2, $R^1$ is a monovalent hydrocarbon group, $R^{24}$ is a monovalent hydrocarbon group or a hydrolyzable group, with the proviso that at least some instances of $R^4$ are monovalent hydrocarbon groups, $R^L$ is a divalent hydrocarbon group, and subscript S is 0, 1, or 2.

14. The copolymer of claim 13, where the copolymer comprises:

A) a polyolefin block comprising units of formula $H_f[(R^{et})_t(R^O)_u]_g$, where subscript f is 0 to 1, subscripts t and u have relative values such that $0<t\leq 1$, $0\leq u\leq 1$, subscript g is 1 or more, each $R^{et}$ represents an ethylene unit, and each $R^O$ represents an olefin unit, other than ethylene;

B) a polysiloxane resin block comprising units of formula $(R^{24}_3SiO_{1/2})_W(R^{24}_2SiO_{2/2})_X(R^{24}SiO_{3/2})_Y(SiO_{4/2})_Z$, where $R^{24}$ is independently selected from the group consisting of a monovalent hydrocarbon group of 1 to 30 carbon atoms, a hydrolyzable group, and an aliphatically unsaturated group, subscripts W, X, Y, and Z have values such that $W\leq 0$, $X\leq 0$, and $(Y+Z)>1$;

C) a linking group comprising a silicon atom and an oxygen atom, where the silicon atom in the linking group is bonded to a carbon atom in the polyolefin block and the oxygen atom in the linking group is bonded to a silicon atom in the polysiloxane resin block, where the linking group has formula

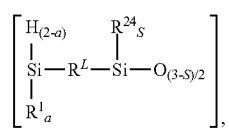

where subscript a is 1 or 2, subscript S is 0, 1, or 2, each $R^{24}$ is independently selected from the group consisting of a monovalent hydrocarbon group of 1 to 30 carbon atoms, a hydrolyzable group, or an aliphatically unsaturated group, each $R^1$ is an independently selected monovalent hydrocarbon group.

15. The copolymer of claim 13, where the copolymer comprises unit formula:

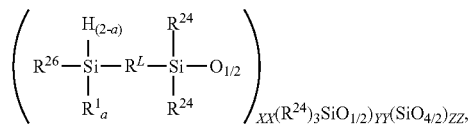

$_{XX}(R^{24}_3SiO_{1/2})_{YY}(SiO_{4/2})_{ZZ}$, where each $R^{26}$ is a polyolefin terminated with one hydrogen atom, subscript XX>0, subscript YY≤0, and subscript ZZ >1.

16. The copolymer of claim 13, where the copolymer comprises unit formula

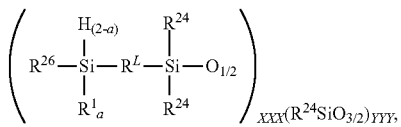

where each $R^{26}$ is a polyolefin terminated with one hydrogen atom, subscript XXX>0, subscript YYY≤0.

17. The copolymer of claim 13, where the copolymer comprises unit formula

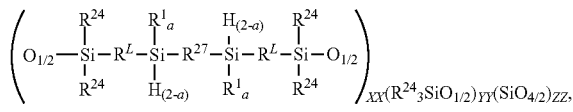

$_{XX}(R^{24}_3SiO_{1/2})_{YY}(SiO_{4/2})_{ZZ}$, where each $R^{27}$ is a divalent polyolefin, subscript XX>0, subscript YY≤0, and subscript ZZ>1.

18. The copolymer of claim 13, where the copolymer comprises unit formula:

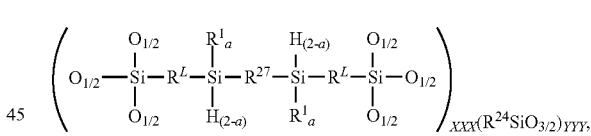

$_{XXX}(R^{24}SiO_{3/2})_{YYY}$, where each $R^{27}$ is a divalent polyolefin, subscript XXX>0, and subscript YYY≤0.

19. A polysiloxane resin-polyolefin copolymer comprising:

A) a polyolefin block of unit formula

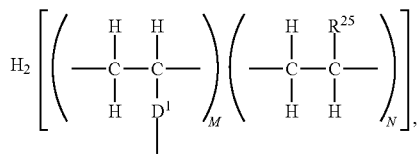

where each $R^{25}$ is independently selected from the group consisting of a hydrogen atom, a monovalent hydrocarbon group of 1 to 18 carbon atoms, and a monovalent halogenated hydrocarbon group of 1 to 18 carbon atoms, each $D^1$ is independently a divalent hydrocarbon group, and subscripts M and N have values such that M≤1 and N≤1;

B) a polysiloxane resin block comprising units of formula $(R^{24}{}_3SiO_{1/2})_W(R^{24}{}_2SiO_{2/2})_X(R^{24}SiO_{3/2})_Y(SiO_{4/2})_Z$, where each $R^{24}$ is independently selected from the group consisting of a monovalent hydrocarbon group of 1 to 30 carbon atoms, and an aliphatically unsaturated group; subscripts W, X, Y, and Z have values such that $W \leq 0$, $X \leq 0$, and $(Y+Z) > 0$;

C) a linking group comprising a silicon atom and an oxygen atom, where the silicon atom in the linking group is bonded to $D^1$ in the polyolefin block and the oxygen atom in the linking group is bonded to a silicon atom in the polysiloxane resin block, where the linking group has formula

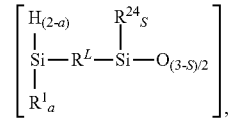

where subscript a is 1 or 2, each $R^1$ is an independently selected monovalent hydrocarbon group, $R^L$ is a divalent hydrocarbon group, subscript S is 0, 1, or 2.

20. The copolymer of claim 19, where the copolymer comprises unit formula:

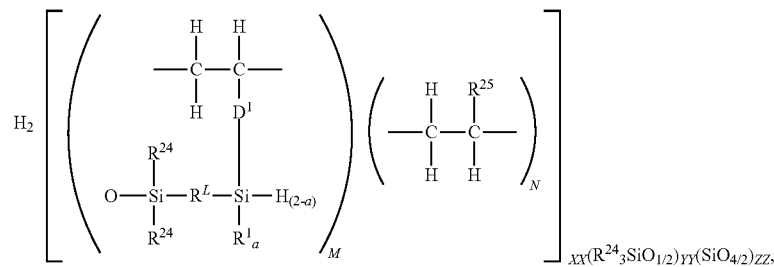

$_{XX}(R^{24}{}_3SiO_{1/2})_{YY}(SiO_{4/2})_{ZZ}$, where subscript XX>0, subscript YY≤0, and subscript ZZ>1.

21. The copolymer of claim 19, where the copolymer comprises unit formula:

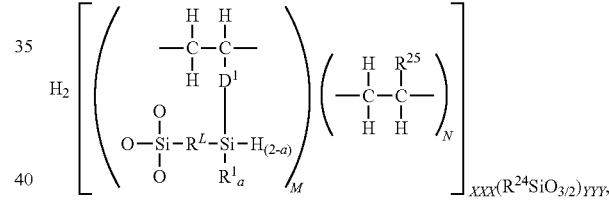

$_{XXX}(R^{24}SiO_{3/2})_{YYY}$, where subscript XXX>0, subscript YYY≤0.

* * * * *

UNITED STATES PATENT AND TRADEMARK OFFICE
CERTIFICATE OF CORRECTION

PATENT NO. : 11,702,512 B2
APPLICATION NO. : 17/055144
DATED : July 18, 2023
INVENTOR(S) : Steven Swier and John Horstman Page 1 of 1

It is certified that error appears in the above-identified patent and that said Letters Patent is hereby corrected as shown below:

In the Claims

In Claim 14, at Column 39, Line 44, between W and 0, replace the "$\leq$" with text, "greater than or equal to".

In Claim 14, at Column 39, Line 44, between X and 0, replace the "$\leq$" with text, "greater than or equal to".

In Claim 16, at Column 40, Line 25, between YYY and 0, replace the "$\leq$" with text, "greater than or equal to".

In Claim 17, at Column 40, Line 36, between YY and 0, replace the "$\leq$" with text, "greater than or equal to".

In Claim 18, at Column 40, Line 49, between YY and 0, replace the "$\leq$" with text, "greater than or equal to".

In Claim 19, at Column 41, Line 7, between W and 0, replace the "$\leq$" with text, "greater than or equal to".

In Claim 19, at Column 41, Line 7, between X and 0, replace the "$\leq$" with text, "greater than or equal to".

In Claim 20, at Column 42, Line 29, between YY and 0, replace the "$\leq$" with text, "greater than or equal to".

In Claim 21, at Column 42, last line, between YYY and 0, replace the "$\leq$" with text, "greater than or equal to".

Signed and Sealed this
Seventh Day of November, 2023

*Katherine Kelly Vidal*

Katherine Kelly Vidal
*Director of the United States Patent and Trademark Office*